(12) United States Patent
Kroeger et al.

(10) Patent No.: US 11,190,334 B2
(45) Date of Patent: *Nov. 30, 2021

(54) TIME-ALIGNMENT MEASUREMENT FOR HYBRID HD RADIO™ TECHNOLOGY

(71) Applicant: Ibiquity Digital Corporation, Columbia, MD (US)

(72) Inventors: Brian W. Kroeger, Sykesville, MD (US); Paul J. Peyla, Elkridge, MD (US)

(73) Assignee: Ibiquity Digital Corporation, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/880,070

(22) Filed: May 21, 2020

(65) Prior Publication Data

US 2020/0287703 A1 Sep. 10, 2020

Related U.S. Application Data

(63) Continuation of application No. 16/284,586, filed on Feb. 25, 2019, now Pat. No. 10,666,416, which is a
(Continued)

(51) Int. Cl.
*H04L 12/18* (2006.01)
*H04H 40/18* (2008.01)
(Continued)

(52) U.S. Cl.
CPC .......... *H04L 7/0041* (2013.01); *H04H 20/18* (2013.01); *H04H 20/30* (2013.01); *H04H 40/00* (2013.01);
(Continued)

(58) Field of Classification Search
CPC ... G10L 15/22; G10L 21/0272; G10L 19/167; G10L 25/78; H04L 12/18;
(Continued)

(56) References Cited

U.S. PATENT DOCUMENTS 6,178,317 B1 1/2001 Kroeger et al.
6,347,120 B1 2/2002 Sakoda
(Continued)

OTHER PUBLICATIONS

"U.S. Appl. No. 15/099,233, Non Final Office Action dated Dec. 16, 2016", 18 pgs.
(Continued)

*Primary Examiner* — Linda Wong
(74) *Attorney, Agent, or Firm* — Schwegman Lundberg & Woessner, P.A.

(57) ABSTRACT

A method for processing audio signals in a radio transmitter, includes: receiving an analog audio sample stream and a digital audio sample stream; determining offsets in time between the analog audio stream and the digital audio stream using a normalized cross-correlation of audio envelopes of the analog audio sample stream and the digital audio sample stream; filtering the determined offsets in time to produce filtered offset values; determining an alignment slip adjustment value as a function of the filtered offset values; aligning the analog audio sample stream and the digital audio sample stream using the determined alignment slip adjustment value; and generating a hybrid radio signal for broadcast that includes time-aligned analog audio and digital audio.

19 Claims, 12 Drawing Sheets

Related U.S. Application Data continuation-in-part of application No. 15/822,411, filed on Nov. 27, 2017, now Pat. No. 10,225,070, which is a continuation of application No. 15/099,233, filed on Apr. 14, 2016, now Pat. No. 9,832,007.

(51) Int. Cl.

| | | |
|---|---|---|
| *H04H 40/00* | (2009.01) | |
| *H04H 60/00* | (2009.01) | |
| *H04H 20/18* | (2008.01) | |
| *H04L 7/00* | (2006.01) | |
| *H04H 20/30* | (2008.01) | |
| *H04H 60/12* | (2008.01) | |

(52) U.S. Cl.
CPC ............ *H04H 40/18* (2013.01); *H04H 60/00* (2013.01); *H04H 60/12* (2013.01); *H04L 12/18* (2013.01); *H04H 2201/13* (2013.01); *H04H 2201/18* (2013.01); *H04H 2201/183* (2013.01); *H04H 2201/186* (2013.01); *H04H 2201/20* (2013.01)

(58) Field of Classification Search
CPC .... H04H 2201/18; H04H 60/12; H04H 20/30; H04H 20/22; H04H 2201/183; H04H 40/00; H04H 60/00; H04H 60/13; H04H 60/88; H04H 20/00; H04H 20/24; H04H 20/28; H04H 2201/12; H04H 2201/186; H04H 2201/20; H04H 6/29; H04H 60/58; H04H 60/90; H04H 60/90; H04W 4/06; H04W 84/12; H04W 88/02; H04W 48/10
See application file for complete search history.

(56) References Cited

U.S. PATENT DOCUMENTS

| | | |
|---|---|---|
| 6,590,944 B1 | 7/2003 | Kroeger |
| 6,735,257 B2 | 5/2004 | Kroeger |
| 6,774,834 B2 | 8/2004 | Dartois |
| 6,836,520 B1 | 12/2004 | Chen |
| 6,901,242 B2 | 5/2005 | Kroeger et al. |
| 6,982,948 B2 | 1/2006 | Kroeger et al. |
| 7,209,531 B1 | 4/2007 | Katz et al. |
| 7,546,088 B2 | 6/2009 | Kroeger et al. |
| 7,733,983 B2 | 6/2010 | Kroeger et al. |
| 7,839,191 B2 | 11/2010 | Takai |
| 7,933,368 B2 | 4/2011 | Peyla et al. |
| 8,014,446 B2 | 9/2011 | Shah et al. |
| 8,180,470 B2 | 5/2012 | Pahuja |
| 8,310,384 B2 | 11/2012 | Yeh et al. |
| 8,408,061 B2 | 4/2013 | Thomas |
| 8,724,757 B2 | 5/2014 | Cochran |
| 8,811,757 B2 | 8/2014 | Batur |
| 8,830,224 B2 | 9/2014 | Zhao et al. |
| 8,976,969 B2 | 3/2015 | Elenes et al. |
| 9,054,905 B2 | 6/2015 | Sen et al. |
| 9,560,461 B2 | 1/2017 | Davis et al. |
| 9,634,704 B2 | 4/2017 | Kroeger et al. |
| 9,832,007 B2 | 11/2017 | Kroeger et al. |
| 10,177,729 B1 | 1/2019 | Pahuja et al. |
| 10,225,070 B2 | 3/2019 | Kroeger et al. |
| 10,666,416 B2 | 5/2020 | Kroeger et al. |
| 2003/0017832 A1 | 1/2003 | Anderson et al. |
| 2004/0043730 A1 | 3/2004 | Schill et al. |
| 2004/0049781 A1 | 3/2004 | Flesch et al. |
| 2004/0071200 A1 | 4/2004 | Betz et al. |
| 2004/0218699 A1 | 11/2004 | Carsello |
| 2004/0235442 A1 | 11/2004 | Toporski |
| 2005/0003772 A1 | 1/2005 | Nemoto |
| 2006/0019601 A1 | 1/2006 | Kroeger et al. |
| 2006/0083380 A1 | 4/2006 | Mino et al. |
| 2006/0227814 A1* | 10/2006 | Iannuzzelli ............ H04H 20/30 370/516 |
| 2007/0195867 A1 | 8/2007 | Betz et al. |
| 2007/0280098 A1 | 12/2007 | Bhatt et al. |
| 2007/0293167 A1 | 12/2007 | Shridhar et al. |
| 2008/0015853 A1* | 1/2008 | Honda .................... G10L 25/78 704/228 |
| 2008/0019609 A1 | 1/2008 | Hamilton et al. |
| 2008/0299926 A1 | 12/2008 | Becker et al. |
| 2009/0167388 A1 | 7/2009 | Lee |
| 2010/0027719 A1 | 2/2010 | Pahuja |
| 2010/0127747 A1 | 5/2010 | Choi et al. |
| 2010/0254498 A1 | 10/2010 | Park et al. |
| 2011/0074479 A1 | 3/2011 | Yun et al. |
| 2011/0187567 A1 | 8/2011 | Yeh et al. |
| 2011/0188609 A1 | 8/2011 | Minato et al. |
| 2012/0108191 A1 | 5/2012 | Henson |
| 2013/0003637 A1 | 1/2013 | Elenes et al. |
| 2013/0003801 A1 | 1/2013 | Elenes et al. |
| 2013/0003894 A1* | 1/2013 | Elenes ................... H04H 60/12 375/316 |
| 2013/0077805 A1 | 3/2013 | Kirsch |
| 2013/0109296 A1 | 5/2013 | Dillon et al. |
| 2013/0115903 A1 | 5/2013 | Kroeger et al. |
| 2013/0303097 A1 | 11/2013 | Sasho |
| 2013/0303098 A1 | 11/2013 | Carlsson et al. |
| 2013/0343576 A1 | 12/2013 | Pahuja |
| 2014/0036765 A1 | 2/2014 | Fujimura et al. |
| 2014/0098981 A1 | 4/2014 | Lunner et al. |
| 2014/0193097 A1 | 7/2014 | Park et al. |
| 2014/0342682 A1 | 11/2014 | Kroeger et al. |
| 2014/0355726 A1 | 12/2014 | Elenes et al. |
| 2015/0244555 A1 | 8/2015 | Castelain |
| 2016/0182192 A1 | 6/2016 | Milbar et al. |
| 2016/0210084 A1 | 7/2016 | Butler et al. |
| 2016/0241350 A1 | 8/2016 | Nekhamkin et al. |
| 2016/0302093 A1 | 10/2016 | Fuller et al. |
| 2016/0363619 A1 | 12/2016 | Chou et al. |
| 2017/0041129 A1 | 2/2017 | Nekhamkin |
| 2017/0169832 A1 | 6/2017 | Olochwoszcz et al. |
| 2017/0302432 A1 | 10/2017 | Kroeger et al. |
| 2018/0139035 A1 | 5/2018 | Kroeger et al. |
| 2019/0190691 A1 | 6/2019 | Kroeger et al. |

OTHER PUBLICATIONS

"U.S. Appl. No. 15/099,233, Notice of Allowance dated Jul. 28. 2017", 13 pgs.
"U.S. Appl. No. 15/099,233, Response filed Apr. 17. 2017 to Non Final Office Action dated Dec. 16. 2016", 10 pgs.
"U.S. Appl. No. 15/822,411, Final Office Action dated Aug. 15, 2018", 16 pgs.
"U.S. Appl. No. 15/822,411, Non Final Office Action dated Feb. 26, 2018", 22 pgs.
"U.S. Appl. No. 15/822,411, Notice of Allowance dated Oct. 12. 2018", 10 pgs.
"U.S. Appl. No. 15/822,411, Response filed May 11, 2018 to Non Final Office Action dated Feb. 26, 2018", 13 pgs.
"U.S. Appl. No. 15/822,411, Response filed Sep. 20, 2018 to Final Office Action dated Aug. 15, 2018", 9 pgs.
"U.S. Appl. No. 16/284,586, Non Final Office Action dated Aug. 8, 2019", 15 pgs.
"U.S. Appl. No. 16/284,586, Notice of Allowance dated Jan. 24, 2020", 10 pgs.
"U.S. Appl. No. 16/284,586, Response filed Nov. 7, 2019 to Non Final Office Action dated Aug. 8, 2019", 10 pgs.
"In-Band/On-Channel Digital Radio Broadcasting Standard", NRSC-5-C, National Radio Systems Committee, Washington, DC,, (Sep. 2011), 6 pgs.
"U.S. Appl. No. 16/682,345, Non Final Office Action dated Jun. 18, 21", 30 pgs.

\* cited by examiner

TIME-ALIGNMENT MEASUREMENT FOR HYBRID HD RADIO™ TECHNOLOGY

CROSS-REFERENCE TO RELATED APPLICATIONS

This application is a Continuation of U.S. patent application Ser. No. 16/284,586, filed on Feb. 25, 2019, which is a Continuation-in-Part of U.S. patent application Ser. No. 15/822,411, filed Nov. 27, 2017 and issued as U.S. Pat. No. 10,225,070, which is a Continuation of U.S. patent application Ser. No. 15/099,233, filed Apr. 14, 2016 and issued as U.S. Pat. No. 9,832,007, the contents of which are incorporated herein by reference in their entireties.

FIELD OF THE INVENTION

The described methods and apparatus relate to the time alignment of analog and digital pathways in hybrid digital radio systems.

BACKGROUND OF THE INVENTION

Digital radio broadcasting technology delivers digital audio and data services to mobile, portable, and fixed receivers. One type of digital radio broadcasting, referred to as In-Band On-Channel (IBOC) digital audio broadcasting (DAB), uses terrestrial transmitters in the existing Medium Frequency (MF) and Very High Frequency (VHF) radio bands. High Definition Radio (HD Radio™) technology, developed by iBiquity Digital Corporation, is one example of an IBOC implementation for digital radio broadcasting and reception.

Both AM and FM In-Band On-Channel (IBOC) hybrid broadcasting systems utilize a composite signal including an analog modulated carrier and a plurality of digitally modulated subcarriers. Program content (e.g., audio) can be redundantly transmitted on the analog modulated carrier and the digitally modulated subcarriers. The analog audio is delayed at the transmitter by a diversity delay. Using the hybrid mode, broadcasters may continue to transmit analog AM and FM simultaneously with higher-quality and more robust digital signals, allowing themselves and their listeners to convert from analog-to-digital radio while maintaining their current frequency allocations.

The digital signal is delayed in the receiver with respect to its analog counterpart such that time diversity can be used to mitigate the effects of short signal outages and provide an instant analog audio signal for fast tuning. Hybrid-compatible digital radios incorporate a feature called "blend" which attempts to smoothly transition between outputting analog audio and digital audio after initial tuning, or whenever the digital audio quality crosses appropriate thresholds.

In the absence of the digital audio signal (for example, when the channel is initially tuned) the analog AM or FM backup audio signal is fed to the audio output. When the digital audio signal becomes available, the blend function smoothly attenuates and eventually replaces the analog backup signal with the digital audio signal while blending in the digital audio signal such that the transition preserves some continuity of the audio program. Similar blending occurs during channel outages which corrupt the digital signal. In this case the analog signal is gradually blended into the output audio signal by attenuating the digital signal such that the audio is fully blended to analog when the digital corruption appears at the audio output.

Blending will typically occur at the edge of digital coverage and at other locations within the coverage contour where the digital waveform has been corrupted. When a short outage does occur, as when traveling under a bridge in marginal signal conditions, the digital audio is replaced by an analog signal.

When blending occurs, it is important that the content on the analog audio and digital audio channels is time-aligned to ensure that the transition is barely noticed by the listener. The listener should detect little other than possible inherent quality differences in analog and digital audio at these blend points. If the broadcast station does not have the analog and digital audio signals aligned, then the result could be a harsh-sounding transition between digital and analog audio. This misalignment or "offset" may occur because of audio processing differences between the analog audio and digital audio paths at the broadcast facility.

The analog and digital signals are typically generated with two separate signal-generation paths before combining for output. The use of different audio-processing techniques and different signal-generation methods makes the alignment of these two signals nontrivial. The blending should be smooth and continuous, which can happen only if the analog and digital audio areproperly aligned.

The effectiveness of any digital/analog audio alignment technique can be quantified using two key performance metrics: measurement time and offset measurement error. Although measurement of the time required to estimate a valid offset can be straightforward, the actual misalignment between analog and digital audio sources is often neither known nor fixed. This is because audio processing typically causes different group delays within the constituent frequency bands of the source material. This group delay can change with time, as audio content variation accentuates one band over another. When the audio processing applied at the transmitter to the analog and digital sources is not the same—as is often the case at actual radio stations—audio segments in corresponding frequency bands have different group delays. As audio content changes over time, misalignment becomes dynamic. This makes it difficult to ascertain whether a particular time-alignment algorithm provides an accurate result.

Existing time alignment algorithms rely on locating a normalized cross-correlation peak generated from the analog and digital audio sample vectors. When the analog and digital audio processing is the same, a clearly visible correlation peak usually results.

However, techniques that rely solely on normalized cross-correlation of digital and analog audio vectors often produce erroneous results due to the group-delay difference described above. When the analog and digital audio processing is different, the normalized cross correlation is often relatively low and lacks a definitive peak.

Although multiple measurements averaged over time can reduce the dynamic offset measurement error, this leads to excessive measurement times and potential residual offset error due to persistent group-delay differences. Since an HD Radio receiver may use this measurement to improve real-time hybrid audio blending, excessive measurement time and offset error make this a less attractive solution. Therefore, improved techniques for measuring time offsets are desired.

SUMMARY

In a first aspect, a method for processing a digital audio broadcast signal in a radio receiver, includes: receiving a hybrid broadcast signal; demodulating the hybrid broadcast signal to produce an analog audio stream and a digital audio stream; and using a normalized cross-correlation of envelopes of the analog audio stream and the digital audio stream to measure a time offset between the analog audio stream and the digital audio stream.

In another aspect, a radio receiver includes processing circuitry configured to receive a hybrid broadcast signal; to demodulate the hybrid broadcast signal to produce an analog audio stream and a digital audio stream; and to use a normalized cross-correlation of envelopes of the analog audio stream and the digital audio stream to measure a time offset between the analog audio stream and the digital audio stream.

In another aspect, a method for aligning analog and digital signals includes: receiving or generating an analog audio stream and a digital audio stream; using a normalized cross-correlation of envelopes of the analog audio stream and the digital audio stream to measure a time offset between the analog audio stream and the digital audio stream; and using the time offset to align the analog audio stream and the digital audio stream.

DETAILED DESCRIPTION

Embodiments described herein relate to the processing of the digital and analog portions of a digital radio broadcast signal. This description includes an algorithm for time alignment of analog and digital audio streams for an HD Radio receiver or transmitter. While aspects of the disclosure are presented in the context of an exemplary HD Radio system, it should be understood that the described methods and apparatus are not limited to HD Radio systems and that the teachings herein are applicable to methods and apparatus that include the measurement of time offset between two signals.

Figure 1:
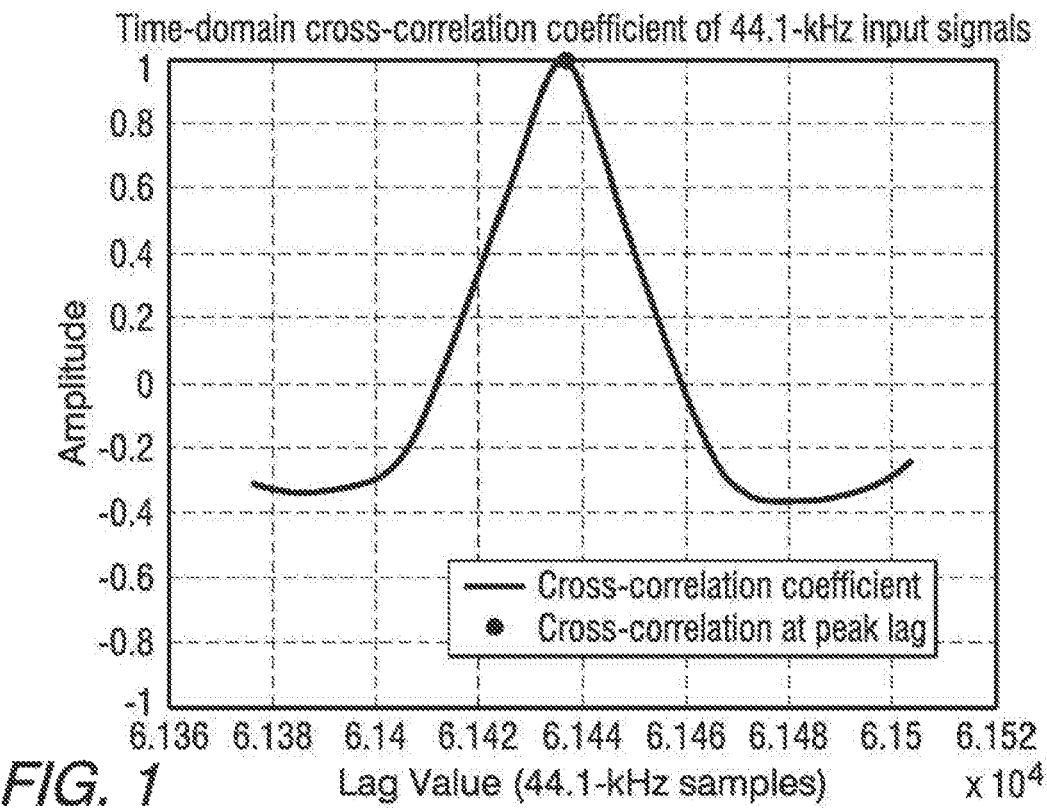
FIG. 1 is a graph of a typical normalized cross-correlation peak with identical analog/digital audio processing.

Previously known algorithms for time alignment of analog and digital audio streams rely on locating a normalized cross-correlation peak generated from the analog and digital audio sample vectors. When the analog and digital audio processing is the same, a clearly visible correlation peak usually results. For example, FIG. 1 is a graph of a typical normalized cross-correlation peak with identical analog/digital audio processing.

However, audio processing typically causes different group delays within the constituent frequency bands of the source material. This group delay can change with time, as audio content variation accentuates one frequency band over another. When the audio processing applied at the transmitter to the analog and digital sources is not the same—as is often the case at actual radio stations—audio segments in corresponding frequency bands have different group delays. As audio content changes over time, misalignment becomes dynamic. This makes it difficult to ascertain whether a particular time-alignment algorithm provides an accurate result.

Figure 2:
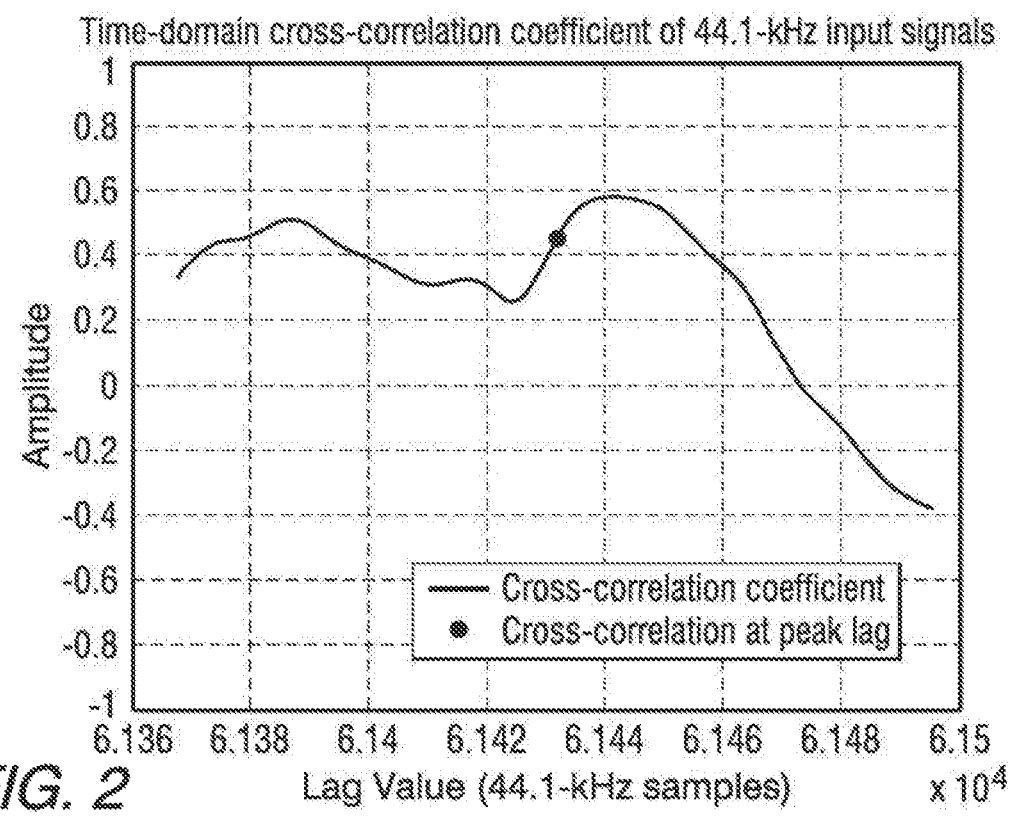
FIG. 2 is a graph of a typical normalized cross-correlation with different analog/digital audio processing.

As a result of this group delay, when the analog and digital audio processing is different, the normalized cross correlation is often relatively low and lacks a definitive peak. FIG. 2 is a graph of a typical normalized cross-correlation with different analog/digital audio processing. Therefore, techniques that rely solely on normalized cross-correlation of digital and analog audio vectors often produce erroneous results.

Figure 3:
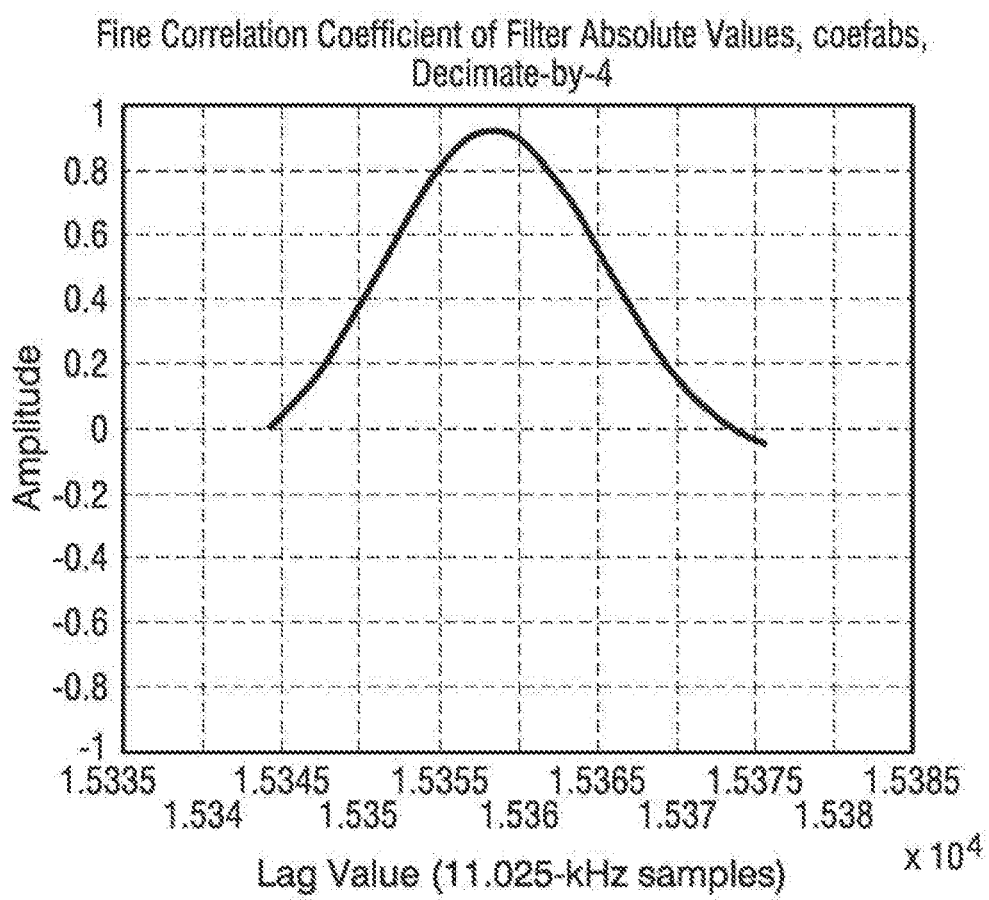
FIG. 3 is a graph of a typical normalized cross-correlation of audio envelopes with different analog/digital audio processing.

Correlation of audio envelopes (with phase differences removed) can be used to reduce or eliminate the problems due to group delay differences. The techniques described herein utilize the correlation of audio envelopes to solve the problem of offset measurement error caused by group-delay variations between the digital and analog audio streams. FIG. 3 is a graph of a typical normalized cross-correlation of audio envelopes with different analog/digital audio processing.

The techniques described herein are efficient and require significantly less measurement time than previously known techniques because the need for consistency checks is reduced. Additionally, a technique for correcting group-delay differences during the blend ramp is described.

Time alignment between the analog audio and digital audio of a hybrid HD Radio waveform is needed to assure a smooth blend from digital to analog in the HD Radio receivers. Time misalignment sometimes occurs at the transmitter, although alignment should be maintained. Misalignment can also occur at the receiver due to implementation choices when creating the analog and digital audio streams. A time-offset measurement can be used to correct the misalignment when it is detected. It can also be used to adjust blending thresholds to inhibit blending when misalignment is detected and to improve sound quality during audio blends.

The described technique is validated by measuring the normalized cross correlation of the analog and digital audio vectors after correcting any group delay differences between them. This results in a more accurate, efficient, and rapid time offset measurement than previous techniques.

In the described embodiment, multistage filtering and decimation are applied to isolate critical frequency bands and improve processing efficiencies. Normalized cross-correlation of both the coarse and fine envelopes of the analog and digital audio streams is used to measure the time offset.

As used in this description, a coarse envelope represents the absolute value of an input audio signal after filtering and decimation by a factor of 128, and a fine envelope represents the absolute value of an input audio signal after filtering and decimation by a factor of 4. Correlation is performed in two steps—coarse and fine—to improve processing efficiency.

Figure 4:
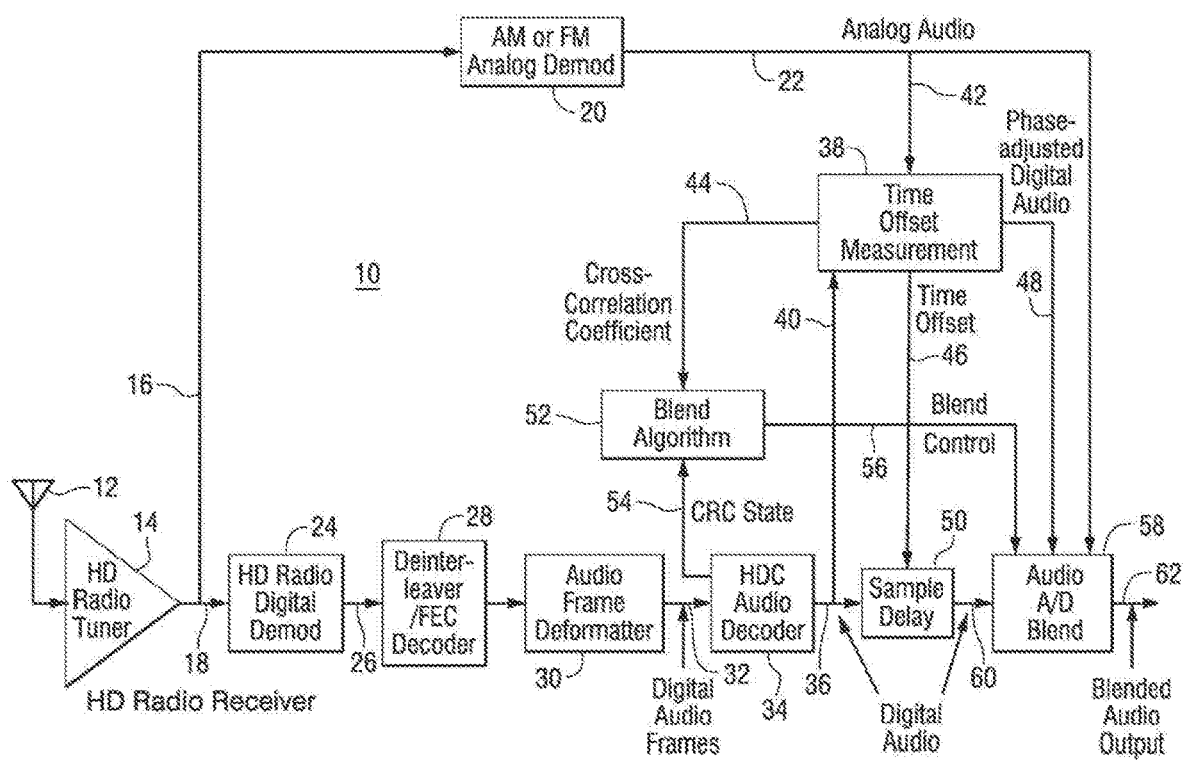
FIG. 4 is a high-level functional block diagram of an HD Radio receiver highlighting the time-alignment algorithm.

A high-level functional block diagram of an HD Radio receiver 10 highlighting the time-alignment algorithm is shown in FIG. 4. An antenna 12 receives a hybrid HD Radio signal that is input to an HD Radio tuner 14. The tuner output includes an analog modulated signal on line 16 and a digitally modulated signal on line 18. Depending upon the input signal, the analog modulated signal could be amplitude modulated (AM) or frequency modulated (FM). The AM or FM analog demodulator 20 produces a stream of audio samples, referred to as the analog audio stream on line 22. The HD Radio digital demodulator 24 produces a stream of digital symbols on line 26. The digital symbols on line 26 are deinterleaved and decoded in a deinterleaver/FEC decoder 28 and deformatted in an audio frame deformatter 30 to produce digital audio frames on line 32. The digital audio frames are decoded in an HD Radio audio decoder 34 to produce a digital audio signal on line 36. A time offset measurement function 38 receives the digital audio signal on line 40 and the analog audio signal on line 42 and produces three outputs: a cross-correlation coefficient on line 44, a time offset signal on line 46, and a phase adjusted digital audio signal on line 48. The time offset signal controls the sample delay of the digital audio signal as shown in block 50.

Cyclic redundancy check (CRC) bits of the digital audio frames are checked to determine a CRC state. CRC state is determined for each audio frame (AF). For example, the CRC state value could be set to 1 if the CRC checks, and set to 0 otherwise. A blend control function 52 receives a CRC state signal on line 54 and the cross-correlation coefficient on line 44 and produces a blend control signal on line 56.

An audio analog-to-digital (A/D) blend function 58 receives the digital audio on line 60, the analog audio on line 22, the phase-adjusted digital audio on line 48, and the blend control signal on line 56, and produces a blended audio output on line 62. The analog audio signal on line 42 and the digital audio signal on line 40 constitute a pair of audio signal vectors.

In the receiver depicted in FIG. 4, a pair of audio-signal vectors is captured for time alignment. One vector is for the analog audio signal (derived from the analog AM or FM demodulator) while the other vector is for the digital signal (digitally decoded audio). Since the analog audio signal is generally not delayed more than necessary for demodulation and filtering processes, it will be used as the reference time signal. The digital audio stream should be time-aligned to the analog audio stream for blending purposes. An intentional diversity delay between the two audio streams allows for time adjustment of the digital audio stream relative to the analog audio stream.

The time offset measurement block 38 in FIG. 4 provides three algorithm outputs, which correspond to three possible embodiments, wherein:
(1) A cross-correlation coefficient may be passed to the blend algorithm to adjust blend thresholds and inhibit blending when misalignment is detected;
(2) The delay of the digital audio signal may be adjusted in real time using the measured time offset, thereby automatically aligning the analog and digital audio; or
(3) Phase-adjusted digital audio may temporarily replace the input digital audio to improve sound quality during blends.

In another embodiment, a filtered time-offset measurement could also be used for automatic time alignment of the analog and digital audio signals in HD Radio hybrid transmitters.

Details of the time-offset measurement technique arede-scribed next.

In this embodiment, monophonic versions of the analog and digital audio streams are used to measure time offset. This measurement is performed in multiple steps to enhance efficiency. It is assumed here that the analog and digital audio streams are sampled simultaneously and input into the measurement device. The appropriate metric for estimating time offset for the analog and digital audio signals is the correlation coefficient function implemented as a normalized cross-correlation function. The correlation coefficient function has the property that it approaches unity when the two signals are time-aligned and identical, except for possibly an arbitrary scale-factor difference. The coefficient generally becomes statistically smaller as the time offset increases. The correlation coefficient is also computed for the envelope of the time-domain signals due to its tolerance to group-delay differences between the analog and digital signals.

Exemplary pseudocode for the executive function that controls the time-offset measurements, MEAS_TIME_ALIGNMENT, is shown below.

```
MEAS_TIME_ALIGNMENT
M = 2 ∧ 13; "length of analog audio vector at 44.1 ksps"
N = 2 ∧ 17;
"length of digital audio vector (implementation dependent)"
results = 0; resultsprev = 0; resultsprev2 = 0; "Clear output vectors"
for k = 0 . . . K - 1; "K is the number of measurement vectors"
    get vector x; "vector of M analog audio samples"
    get vector y; "vector of N digital audio samples"
    [xenv, yenv, xabsf, yabsf, xbass, ybass] = filter_vectors (x, y)
    lagmin = 0
    lagmax = length (yenv) - length (xenv), "Set coarse lag range"
    [peakabs, offset, corr_coef, corr_phadj, ynormadj, peakbass] =
        meas_offset (x, y, xenv, yenv, xabsf, yabsf, xbass, ybass, lagmin,
        lagmax)
    "output arguments are set to zero if not measured due to
    RETURN or invalid"
    resultsprev2 = resultsprev; "save results from two iterations ago"
    resultsprev = results; "save results from previous iteration"
    results = [peakabs, offset, corr_coef, corr_phadj, ynormadj,
    peakbass]
    "Analyze results to determine if time offset measurement is
    successful"
    if (corr_phadj > 0.8) ∧

{ (peakabs > 0.8) ∨
      [(|offset − offset_prev| ≤ 2) ∧ (peakabs + peakabs_prev > 1)] ∨
      [(|offset − offset_prev2| ≤ 2) ∧ (peakabs + peakabs_prev2 > 1)] } end if
    "Continue with next measurement vector if results are not validated"
end for
```

A vector y of N digital audio samples is first formed for the measurement. Another smaller M-sample vector x of analog audio samples is used as a reference analog audio vector.

The goal is to find a vector subset of y that is time-aligned with x. Ideally, the signals are nominally time-aligned with the center of the y vector. This allows the time-offset measurement to be computed over a range of $\pm(N-M)/2$ samples relative to the midpoint of the y vector. A recommended value of N is $2^{17}=131072$ audio samples spanning nearly three seconds at a sample rate of 44.1 ksps. The search range is about ±1.4 seconds for $M=2^{13}=8192$ (approximately 186 msec).

The analog and digital audio input vectors are then passed through a filter_vectors function to isolate the desired audio frequency bands and limit processor throughput requirements. The audio spectrum is separated into several distinct passbands for subsequent processing. These bands include the full audio passband, bass frequencies, and bandpass frequencies. The bandpass frequencies are used to create the audio envelopes that are required for accurate cross-correlation with phase differences removed. Bass frequencies are removed from the bandpass signals since they may introduce large group-delay errors when analog/digital audio processing is different; however, the isolated bass frequencies may be useful to validate the polarity of the audio signals. Furthermore, high frequencies are removed from the bandpass signal because time-alignment information is concentrated in lower non-bass frequencies. The entire audio passband is used to predict potential blend sound quality and validate envelope correlations.

After filtering, the range of coarse lag values is set and function meas_offset is called to perform the time-offset measurement. The coarse lag values define the range of sample offsets over which the smaller analog audio envelope is correlated against the larger digital audio envelope. This range is set to the difference in length between the analog and digital audio envelopes. After the coarse envelope correlation is complete, a fine envelope correlation is performed at a higher sample rate over a narrower range of lag values.

The results are then analyzed to determine whether the correlation peaks and offset values are valid. Validity is determined by ensuring that key correlation peaks exceed a threshold, and that these peak correlation values and their corresponding offset values are temporally consistent.

If not, the process repeats using new input measurement vectors until a valid time offset is declared. Once a valid time offset has been computed, the algorithm can be run periodically to ensure that proper time-alignment is being maintained.

The executive pseudocode MEAS_TIME_ALIGNMENT calls subsequent functions.

Figure 5:
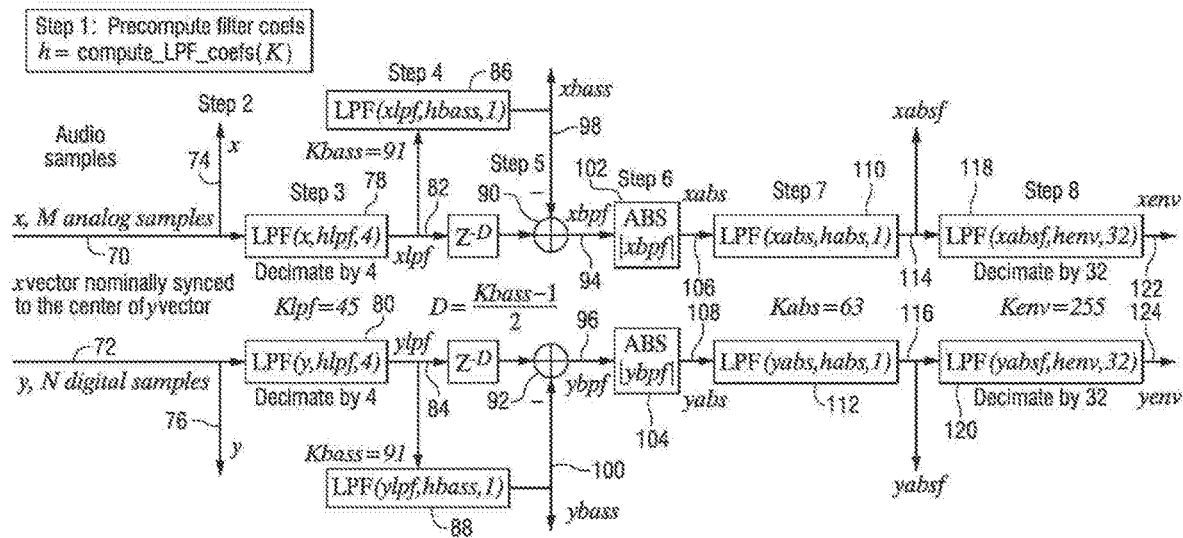
FIG. 5 is a signal flow diagram of an exemplary filtering and decimation function.
Figure 12:
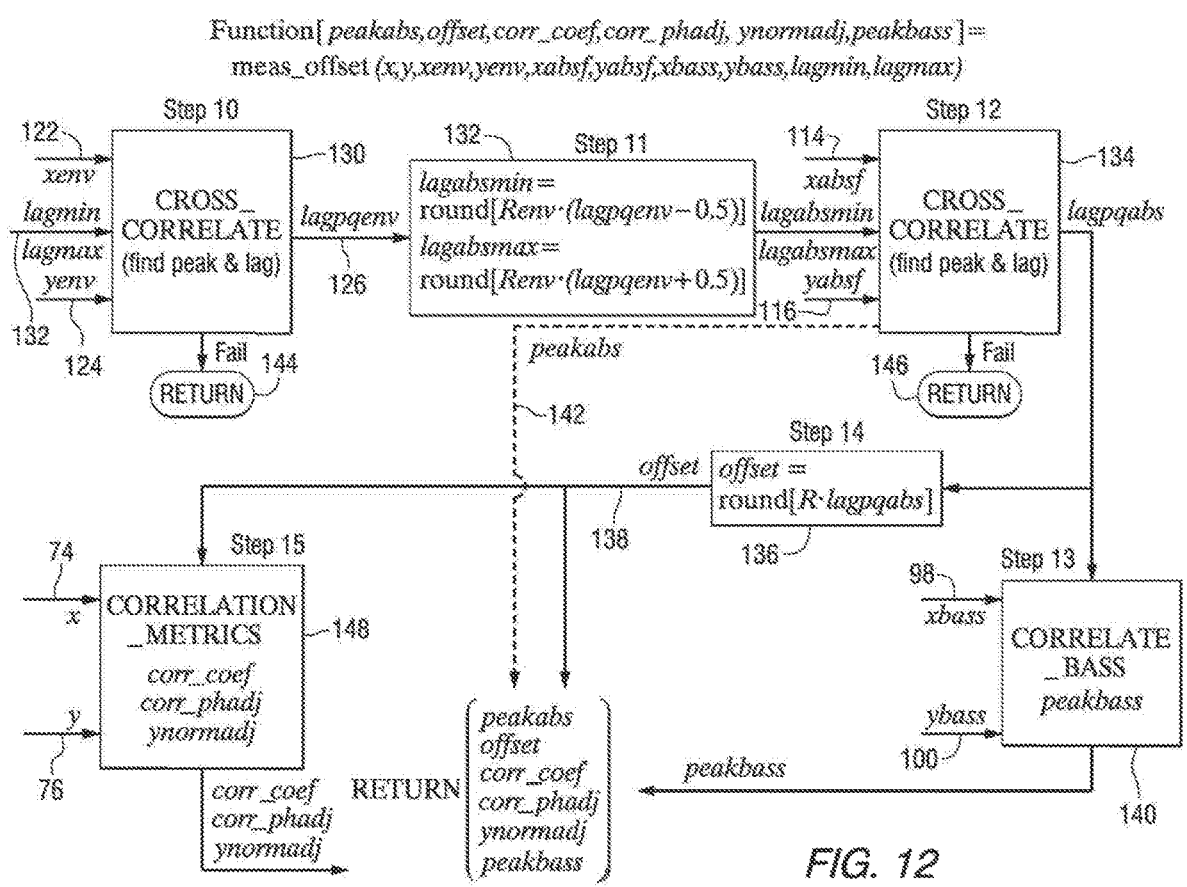
FIG. 12 is a functional block diagram of an exemplary time-alignment algorithm.

The time-offset measurements as a hierarchical series of functions are described below. These functions are described either as signal-flow diagrams or pseudocode, whichever is more appropriate for the function. FIGS. 5 and 12 are annotated with step numbers for cross-referencing with step-by-step implementation details provided below.

FIG. 5 is a signal flow diagram of the first function filter_vectors called by MEAS_TIME_ALIGNMENT.

The input audio vectors x and y on lines 70 and 72 are initially processed in multiple stages of filtering and decimation, as shown in FIG. 5. The x and y sample streams are available for further processing on lines 74 and 76. Multistage processing is efficient and facilitates several types of measurements. The x and y vectors are first lowpass filtered by filters 78 and 80 to prevent subsequent cross-correlation of higher frequencies that could be affected by slight time offsets, and to improve computational efficiency. This produces xlpf and ylpf signals on lines 82 and 84, respectively. Even lower bass frequencies are removed from the xlpf and ylpf signals using filters 86 and 88 and combiners 90 and 92 to create bandpass signals xbpf and ybpf on line 94 and 96. This eliminates large group-delay variations caused by different bass processing on the analog and digital versions of the audio, which could also affect the envelope in subsequent processing. The xbass and ybass signals are available for further processing on lines 98 and 100.

The bandpass filter stages are followed by an absolute-value function 102 and 104 to allow envelope correlation. The resulting xabs and yabs signals on lines 106 and 108 are then filtered by filters 110 and 112 to produce xabsf and yabsf on lines 114 and 116, which are used to determine the fine cross-correlation peak. These signals are further filtered and decimated in filters 118 and 120 to yield the coarse envelope signals xenv and yenv on lines 122 and 124. The coarse envelope cross-correlation is used to locate the vicinity of the correlation time offset, allowing subsequent fine correlation of xabsf and yabsf to be efficiently computed over a narrower range of lag values.

Figure 6:
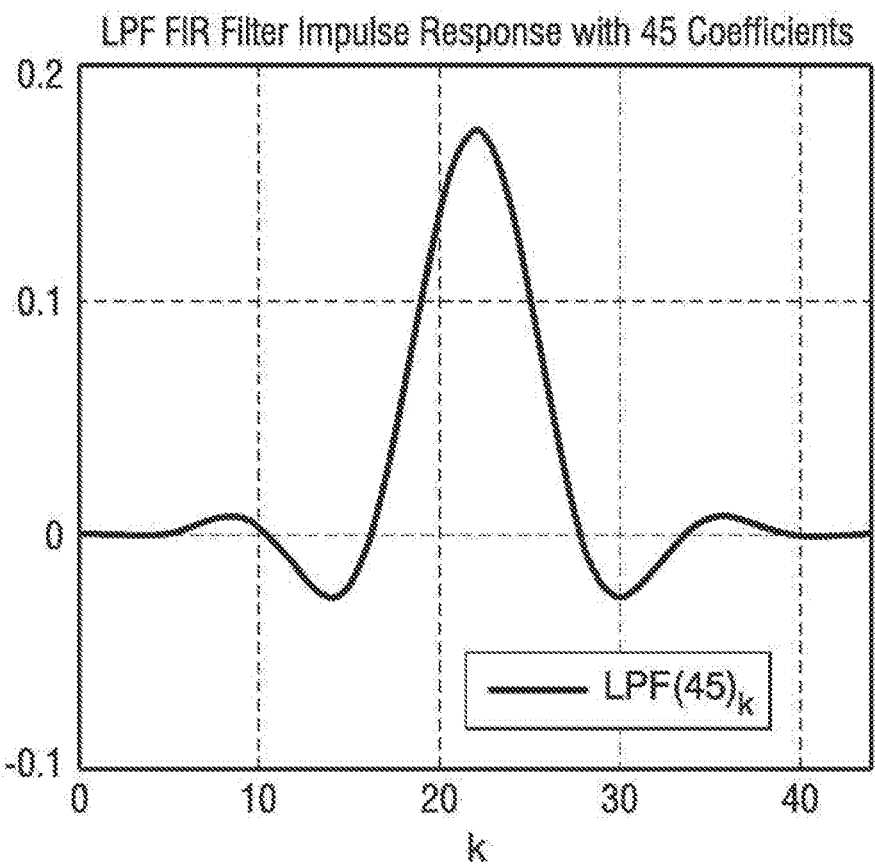
FIG. 6 is a graph of a filter impulse response.

FIG. 6 is a graph of an LPF FJR filter impulse response. Each of the lowpass filters (LPFs) in FIG. 5 has a similar impulse response based on a cosine-squared windowed sine function, as illustrated in FIG. 6. All filters have the same shape spread over the number of selected coefficients K, where K=45 in this example.

The signals are scaled in time by the number of filter coefficients K, which inversely scales frequency span. The filter coefficients for each predetermined length K can be pre-computed for efficiency using function compute_LPF_coefs, defined below.

Exemplary pseudocode for the function compute_LPF_coefs for generating filter coefficients follows.

---

Function [h] = compute_LPF_coefs (K)

"Compute K LPF FIR filter coefficients, K is odd, k = 0 to K − 1"

$$h_{\frac{K-1}{2}} = \frac{4 \cdot \pi}{K+1}; \text{ "center coefficient to avoid divide-by-zero"}$$

for $k = 1 \ldots \frac{K-1}{2}$ $$h_{k+\frac{K-1}{2}} = \frac{\cos\left(\frac{\pi \cdot k}{K+1}\right)^2 \cdot \sin\left(\frac{8 \cdot \pi \cdot k}{K+1}\right)}{2 \cdot k}; \text{ "upper half coefficients"}$$

$$h_{\frac{K-1}{2}-k} = h_{k+\frac{K-1}{2}}; \text{ "copy to lower half coefficients"}$$

end for $$h = \frac{h}{\sum_{k=0}^{K-1} h_k}; \text{ "normalize filter coefficient vector for unity dc gain"}$$

---

The filter inputs include the input vector u, filter coefficients h, and the output decimation rateR.

Exemplary pseudocode for the LPF function is:

```
Function [v] = LPF (u, h, R)
"u is the input signal vector, h is the filter coefficient vector,
R is decimation rate"
```

-continued

```
K = length(h); "Number of filter coefficients"
```

$$N = ceil\left(\frac{length(u) - K + 1}{R}\right);$$

"N is the length of the filter output vector v"

$$v_n = \sum_{k=0}^{K-1} h_k \cdot u_{u \cdot R + k}; \text{ for } n = 0 \ldots N-1$$

Filter passbands for the various signals of FIG. 5 in an exemplary embodiment are shown in FIGS. 7-11.

Figure 7:
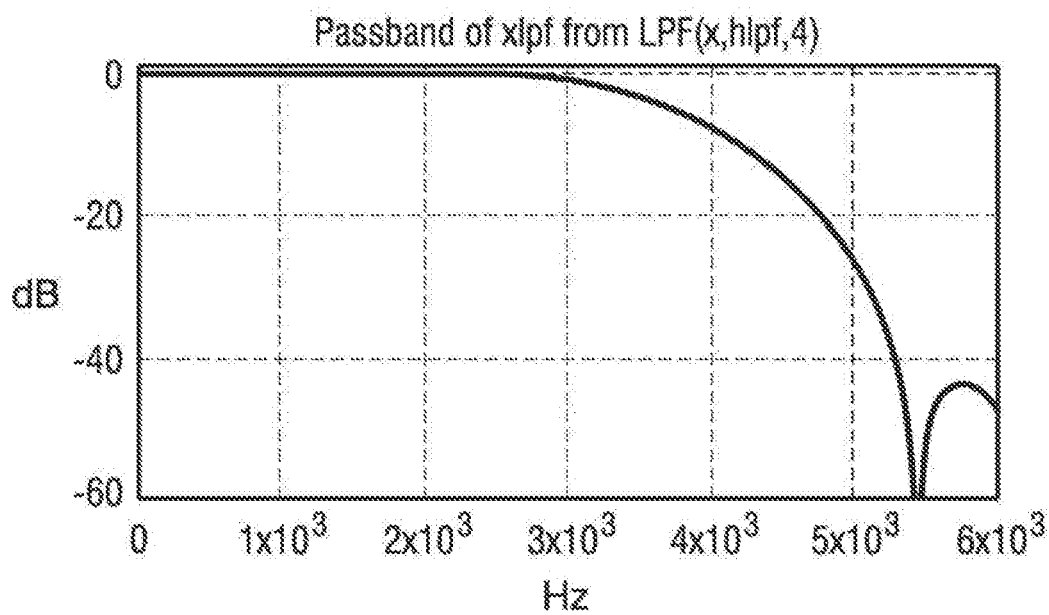
FIGS. 7 through 11 are graphs that illustrate filter passbands.
Figure 8:
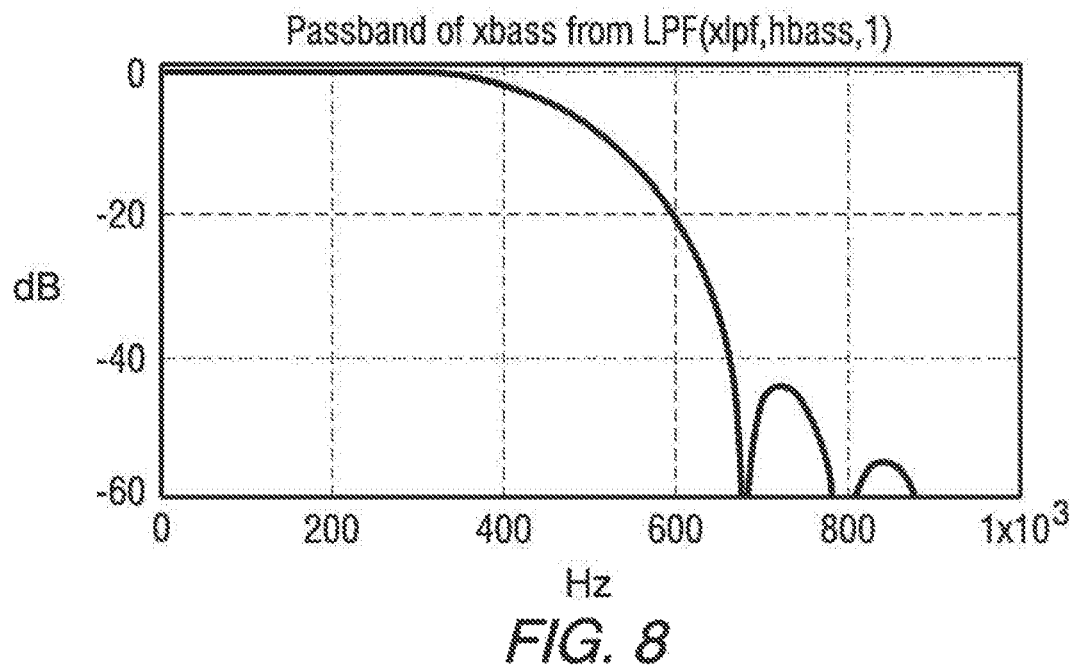
Figure 9:
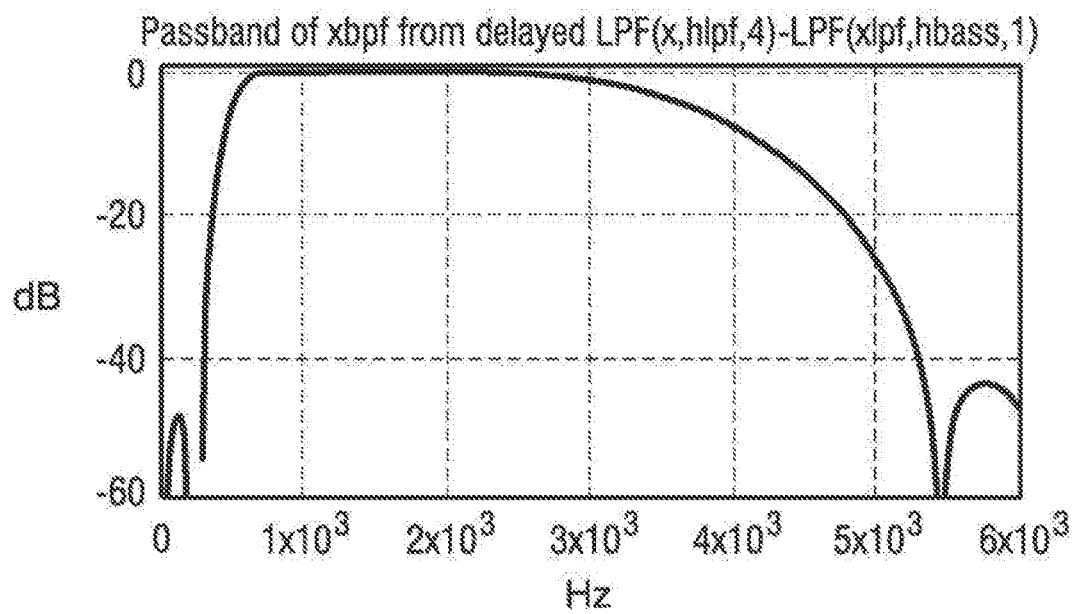
Figure 10:
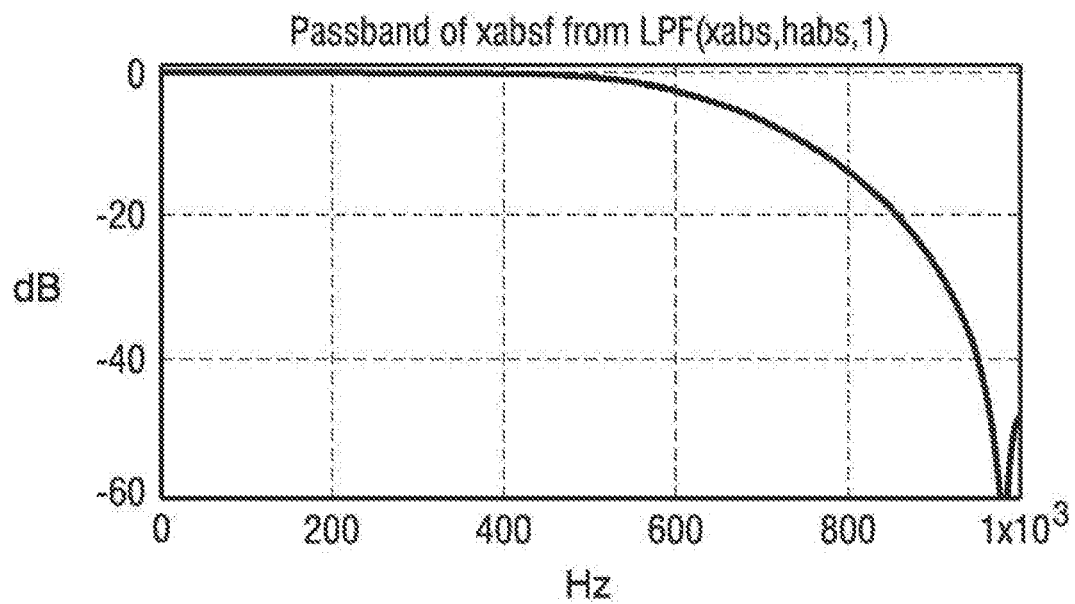
Figure 11:
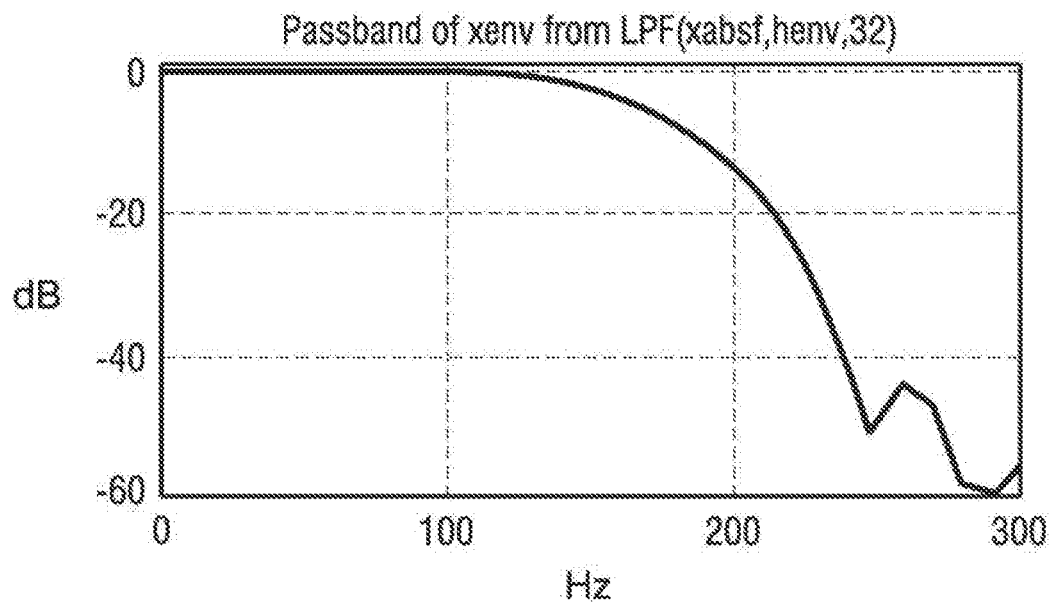

FIG. 7 shows the passband of xlpf from LPF(x, hlpf, 4). FIG. 8 shows the passband of xbass from LPF(xlpf, hbass, 1). FIG. 9 shows the passband of xbpf from appropriately delayed LPF(x, hlpf, 4)—LPF(xlpf, hbass, 1). FIG. 10 shows the passband of xabsf from LPF(xabs, habs, 1). FIG. 11 shows the passband of xenv from LPF(xabsf, henv, 32).

After filtering, the executive MEAS_TIME_ALIGNMENT estimates the time offset between input analog and digital audio signals by invoking function meas_offset. An embodiment of a signal-flow diagram of the second function meas_offset called by executive MEAS TIME ALIGNMENT is shown in FIG. 12.

As alluded to above, normalized cross-correlation should be performed on the envelopes of the audio signals to prevent group-delay differences caused by different analog/digital audio processing. For efficiency, this correlation is performed in two steps—coarse and fine—by the function CROSS_CORRELATE.

Referring to FIG. 12, the meas_offset function first calls a CROSS_CORRELATE function 130 to compute a coarse cross-correlation coefficient using the input audio envelopes xenv on line 122 and yenv on line 124 (which are decimated by a factor of 128 from the input audio signals). The range of lag values on line 132 used for this correlation is computed by the executive, and allows sliding of the smaller xenv vector through the entire length of yenv. The coarse correlation in block 130 is performed at a modest sample rate. The resulting coarse correlation peak index lagpqenv on line 126 effectively narrows the range of lag values (from lagabsmin to lagabsmax in block 132) for subsequent fine correlation in block 134 of xabsf on line 114 and yabsf on line 116. This fine correlation is also performed by function CROSS_CORRELATE at a sample rate that is 32 times higher. The index of the fine correlation peak, following conversion to an integer number of 44.1-ksps audio samples in block 136, is output as offset on line 138 (the desired time-offset measurement). The peak correlation value peakabs is determined in block 134 and returned on line 142. If the result of either the coarse or fine correlation is invalid, control is passed back to the executive and processing continues with the next measurement vector, as shown in blocks 144 and 146.

Exemplary pseudocode for the CROSS_CORRELATE function is provided below.

```
Function[peak.,lagpq] = CROSS_ CORRELATE{u, v,lagmin,lagmax)
"Compote the cross-correlation of theinput vectors, and their components a&b"
[coefa,coejb,coef] =corr_coef_vectors(u,v,lagmin,lagmax)
"Find the peak of the vectors"
[peaka,lagpqa] = peak_lag (coefa)
[peakb,lagpqb] = peak_lag(coefb)
[peak,lagpq] = peak_lag(coef)
"Check if the measurement peak is valid"
RETURN FAIL if (peak<0.7)v(lagpq-lagpqal >0.5)v(lagpq-lagpqbl >0.5)
```

The CROSS_CORRELATE function first calls function corr_coef_vectors to split in half each input vector and compute cross-correlation coefficients not only for the composite input vectors (coef), but also for their bifurcated components (coefa and coefb). The peak index corresponding to each of the three correlation coefficients (lagpq, lagpqa, and lagpqb) is also determined by function peak_lag. This permits correlation validation via temporal consistency. If the lags at the peaks of the bifurcated components both fall within half a sample of the composite lag (at the native sample rate), and if the composite peak value exceeds a modest threshold, the correlation is deemed valid. Otherwise, control is passed back to meas_offset and MEAS_TIME_ALIGNMENT, and processing will continue with the next measurement vector.

After the inputs to function corr_coef_vectors have been bifurcated, the mean is removed from each half to eliminate the bias introduced by the absolute value (envelope) operation in function filter_vectors. The cross-correlation coefficient also requires normalization by the signal energy (computed via auto-correlation of each input) to ensure the output value does not exceed unity. All of this processing need only be performed once for the shorter analog input vector u. However, the digital input vector v must be truncated to the length of the analog vector, and its normalization factors (Svva and Svvb) and the resulting cross-correlation coefficients are calculated for each lag value between lagmin and lagmax. To reduce processing requirements, the correlation operations are performed only for the bifurcated vectors. The composite correlation coefficient coef is obtained through appropriate combination of the bifurcated components.

Exemplary pseudocode of the first function corr_coef_vectors called by CROSS_CORRELATE is as follows. Note that all correlation operations are concisely expressed as vector dot products.

```
Function [coefa, coefb, coef] = corr_coef_vectors (u, v, lagmin, lagmax)
"cross-correlate smaller vector u over longer vector v over lag range"
"bifurcate vector u into 2 parts ua and ub each of length Ka"
```

$$Ka = floor\left(\frac{length(u)}{2}\right)$$

```
uam = subvector (u, 0 . . . Ka − 1); "extract first half of vector u"
ua = uam − mean (uam)
ubm = subvector (u, Ka . . . 2 · Ka − 1); "extract second half of vector u"
ub = ubm − mean (ubm)
Suua = ua • ua; "vector dot product, scalar result"
```

-continued

```
Suub = ub • ub; "vector dot product, scalar result"
for lag = lagmin ... lagmax; "correlation coefficients each lag"
    vam = subvector (v, lag ... lag + Ka − 1)
    va = vam − mean (vam)
    vbm = subvector (v, lag + Ka ... lag + 2 · Ka − 1)
    vb = vbm − mean (vbm)
    Svva = va • va
    Svvb = vb • vb
    Suva = ua • va
    Suvb = ub • vb
```

$$coefa_{lag} = \frac{Suva}{\sqrt{Suua \cdot Svva}}$$

$$coefb_{lag} = \frac{Suvb}{\sqrt{Suub \cdot Svvb}}$$

$$coef_{lag} = \frac{Suva + Suvb}{\sqrt{(Suua + Suub) \cdot (Svva + Svvb)}}$$

end for

Exemplary pseudocode of the second function peak/lag called by CROSS_CORRELATE is as follows.

```
Function [peak, lagpq] = peak_lag (coef)
"Find vector peak and lag index lagpq"
L = length (coef)
peak = 0
lagp = 0
for lag = 0 ... L − 1
    if coef_lag > peak
        peak = coef_lag
        lagp = lag
end for
if (lagp = 0) ∨ (lagp = L − 1)
    peak = 0
    lagpq = 0
otherwise
    "quadratic fit peak"
```

$$lagpq = lagp + \frac{coef_{lagp-1} - coef_{lagp+1}}{2 \cdot (coef_{lagp-1} + coef_{lagp+1}) - 4 \cdot coef_{lagp}}$$

Function peak_lag is called by CROSS_CORRELATE to find the peak value and index of the input cross-correlation coefficient. Note that if the peak lies on either end of the input vector, both the outputs (peak and lagpq) will be cleared, effectively failing the cross-correlation operation. This is because it is not possible to determine whether a maximum at either end of the vector is truly a peak. Also, since this function is run at a relatively coarse sample rate (either 44100/4=11025 Hz or 44100/128=344.53125 Hz), the resolution of the peak lag value is fairly granular. This resolution is improved via quadratic interpolation of the peak index. The resulting output lagpq typically represents a fractional number of samples; it is subsequently rounded to an integer number of samples in the meas_offset function.

Function CORRELATION_METRICS in block 148 of FIG. 12 is called by meas_offset to validate the fine time-offset measurement and generate phase-adjusted digital audio for improved blend quality. In the described embodiment, all correlations are performed at the single lag offset (as opposed to a range of lag values). As in other functions, correlations are normalized and compactly expressed as dot products.

Exemplary pseudocode of the function CORRELATION_METRICS called by meas_offset is as follows.

```
Function [corr_coef; corr_phadj, ynormadj] =
CORRELATION_METRICS (x, y, offset)
Kt = 2^{floor{log 2[length(x)]}}; "truncate vector size to largest power of 2"
xpart = subvector (x, 0, Kt − 1)
ypart = subvector (y, offset, offset + Kt − 1)
```

$$xnorm = \frac{xpart}{\sqrt{xpart \bullet xpart}}; \text{"• dot product scalar result"}$$

$$ynorm = \frac{ypart}{\sqrt{ypart \bullet ypart}}; \text{"• dot product scalar result"}$$

```
corr_coef = xnorm • ynorm; "• dot product scalar result"
XNORM = FFT (xnorm)
YNORM = FFT (ynorm)
XMAG = |XNORM|;
"compute magnitude of each element of XNORM"
YMAG = |YNORM|;
"compute magnitude of each element of YNORM"
corr_phadj = Kt · XMAG • YMAG;
"phase-adjusted correlation coefficient"
```

$$YNORMADJ = \frac{YMAG \cdot XNORM}{XMAG};$$

"impose XNORM phase onto YNORM elements"

```
ynormadj = IFFT (YNORMADJ);
"phase-adjusted ynorm, ready for blending"
```

Although it is important to avoid the effects of group-delay differences by correlating the envelopes of the analog and digital audio signals, it is also important to recognize that these envelopes contain no frequency information. Function CORRELATION_METRICS in block 148 of FIG. 12 cross-correlates the magnitudes of the input 44.1-ksps analog and digital audio signals (x on line 74 and y on line 76) in the frequency domain at the computed offset. If these frequency components are well correlated (i.e., the output con-elation coefficient corr_phadj is sufficiently high), there can be a high degree of confidence that the time-offset measurement is correct. Note that input vector lengths are truncated to the largest power of two to ensure more efficient operation of the FFTs, and constant Kt is an FFT-dependent scalefactor.

Standard time-domain normalized cross-correlation of the input audio signals x and y is also performed at lag value offset by function CORRELATION_METRICS, yielding the output corr_coef. The value of corr_coef can be used to predict the sound quality of the blend. As previously noted, however, corr_coef will likely yield ambiguous results if analog/digital audio processing differs. This would not be the case, however, if the phase of the digital audio input were somehow reconciled with the analog phase prior to correlation. This is achieved in CORRELATION_METRICS by impressing the phase of the analog audio signal onto the magnitude of the digital signal. The resulting phase-adjusted digital audio signal ynormadj could then be temporarily substituted for the input digital audio y during blend ramps to improve sound quality.

Finally, cross-correlation of xbass on line 98 and ybass on line 100 is performed by function CORRELATE_BASS in block 140 of FIG. 12 at the peak offset value to form output variable peakbass. This measure indicates how well the phase of the bass audio frequencies is aligned with the higher frequencies. If the peakbass value is negative, then the analog or digital audio signal may be inverted. Output peakbass could be used to detect potential phase inversion, to validate the time-offset measurement, or to improve blend quality.

Exemplary pseudocode of the function CORRELATE BASS called by meas_offset is as follows.

```
Function [peakbass] = CORRELATE_BASS (xbass, ybass, lagpqabs)
"cross-correlate shorter vector xbass over longer vector
ybass at single lag value lagpqabs"
lag = round (lagpqabs)
Kb = length (xbass)
Sxx = xbass • xbass;
"vector dot product, scalar result for normalization of xbass"
y = subvector (ybass, lag . . . lag + Kb − 1);
"select xbass-sized segment of ybass starting at lag"
Syy = y • y; "normalization of y"
Sxy = xbass • y
```

$$peakbass = \frac{Sxy}{\sqrt{Sxx \cdot Syy}};$$

"Cross-correlation coefficient at peak lag value"

Return values peakabs, offset, and corr_phadj of function meas_offset are all used by the executive MEAS_TIME_ALIGNMENT for validating the time-offset measurement.

The steps used to implement the time-offset measurement algorithm are delineated in the executive pseudocode of MEAS_TIME_ALIGNMENT. The time offset is computed in several stages from coarse (envelope) to fine correlation, with interpolation used between stages. This yields an efficient algorithm with sufficiently high accuracy. Steps through 8 describe the filtering operations defined in the signal-flow diagram of FIG. 5.

[xenv,yenv,xabsf,yabsf,xbass,ybass]=filter_vectors(x, y)

Steps 10 through 15 describe the correlation operations defined in the signal-flow diagram of FIG. 12.

[peakabs,offset,offset,corr_coef,corr_phadj,ynormadj, peakbass]=meas_offset(x,y,xenv,yenv,xabsf, yabsf,xbass,ybass,lagmin,lagmax)

Step 1—
Pre-compute the filter coefficients for each of the four constituent filters in the filter_vectors function defined in the signal-flow diagram of FIG. 5. The xbass and ybass signals are available for further processing on lines 98 and 100.

The number of coefficients for each filter (Klpf Kbass, Kabs, and Kenv) is defined in FIG. 5. The filter coefficients are computed by the function compute_LPF_coefs defined above.

hlpf=compute_LPF_coefs(Klpf)

hbass=compute_LPF_coefs(Kbass)

habs=compute_LPF_coefs(Kabs)

henv=compute_LPF_coefs(Kenv)

Step 2—
Prepare monophonic versions of the digital and analog audio streams sampled at 44.1 ksps. It is recommended that the audio be checked for possible missing digital audio frames or corrupted analog audio. Capture another audio segment if corruption is detected on the present segment. Form x and y input vectors. They vector consists ofN digital audio samples. The x vector consists of M<N analog audio samples which are nominally expected to align near the center of the y vector.

Step 3—
Filter and decimate by rate R=4 (11,025-Hz output sample rate) both analog and digital audio (and y) to produce new vectors xlpfand ylpf respectively. The filter output is computed by the FIR filter function LPF defined in the above pseudocode LPF for performing filter processing.

xlpf=LPF(x,hlpf,R)

ylpf=LPF(y,hlpf,R)

Step 4—
Filter vectors xlpf and ylpf to produce new vectors xbass and ybass, respectively. The filter output is computed by the FIR filter function LPF defined in the above pseudocode LPF for performing filter processing.

xbass=LPF(xlpf,hbass,1)

ybass=LPF(ylpf,hbass,1)

Step 5—
Delay vector xlpf by D=(Kbass−1)/2 samples to accommodate bass FIR filter delay. Then subtract vector xbass from the result to yield new vector xbpf. Similarly, subtract vectorybass from ylpf (after_delay of D samples) to yield new vector ybpf The output vectors xhpf and ybpf have the same lengths as vectors xbass and ybass.

xbpf$_m$=xlpf$_{m+D}$−xbass$_m$; for $m$=0 . . . length (xbass)−1 ybpf$_n$=ylpf$_{n+D}$−ybass$_n$; for $n$=0 . . . length(ybass)−1

Step 6—
Create new vectors xabs and yabs by computing the absolute values of each of the elements of xbpf and ybpf xabs$_m$=|xbpf$_m$|, for $m$=0 . . . length(xbpf)−1 yabs$_n$=|ybpf$_n$|, for $n$=0 . . . length(ybpf)−1

Step 7—
Filter vectors xabs and yabs to produce new vectors xabsf and yabsf, respectively. The filter output is computed by the FIR filter function LPF defined in the above pseudocode LPF for performing filter processing.

xabsf=LPF(xabs,habs,1)

yabsf=LPF(yabs,habs,1)

Step 8—
Filter and decimate by rate Renv=32 (344.53125-Hz output sample rate) both analog and digital audio (xabsf and yabsf) to produce new vectors xenv and yenv, respectively. The filter output is computed by the FIR filter function LPF defined in the above pseudocode LPF for performing filter processing.

xenv=LPF(xabsf,henv,Renv)

yenv=LPF(yabsf,henv,Renv)

Step 9—
Compute the lag range for the coarse envelope correlation.

lagmin=0 lagmax=length(yenv)−length(xenv)

Step 10—
Use the CROSS_CORRELATE function defined above to compute coarse envelope correlation-coefficient vectors from input vectors xenv and yenv over the range lagmin to lagmax. Find the correlation maximum peakenv and the quadratic interpolated peak index lagpenv. If the measurement is determined invalid, control is returned to the executive and processing continues with the next measurement vector of analog and digital audio samples. Note that efficient computing can eliminate redundant computations.

[peakenv,lagpqenv]=CROSS_CORRELATE(xenv,
  yenv,lagmin,lagmax)

Step 11—

Compute the lag range for the fine correlation of xabsf and yabsf Set the range ±0.5 samples around lagpqenv, interpolate by Renv. and round to integer sample indices.

lagabsmin=round[Renv·(lagpqenv−0.5)]

lagabsmax=round[Renv·(lagpqenv+0.5)]

Step 12—

Use the CROSS_CORRELATE function defined above, to compute fine correlation coefficient vectors from input vectors xabsf and yabsfover the range lagabsmin to lagabsmax. Find the correlation maximum peakabs and the quadratic interpolated peak index lagpqabs. If the measurement is determined invalid, control is returned to the executive and processing continues with the next measurement vector of analog and digital audio samples. Note that efficient computing can eliminate redundant computations. Although the time offset is determined to be lagpqabs, additional measurements will follow to further improve the confidence in this measurement.

[peakabs,lagpqabs]=CROSS_CORRELATE(xabsf,
  yabsf,lagabsmin,lagabsmax)

Step 13—

Use the CORRELATE_BASS function defined above, to compute correlation coefficient peakbass from input vectors xbass and ybass at index lagpqabs.

peakbass=CORRELATE_BASS(xbass,ybass,
  lagpqabs)

Step 14—

Compute the offset (in number of 44.1-ksps audio samples) between the analog and digital audio vectors x and y. This is achieved by interpolating fine peak index lagpqabs by R=4 and rounding the result to integer samples.

offset=round[R·lagpqabs]

Step 15—

Use the CORRELATION_METRICS function defined above to compute the correlation value corr_coef between the 44.1-ksps analog and digital audio input vectors x and y at the measured peak index offset. The frequency-domain correlation value corr_phadj is also computed after aligning the group delays of the x and y vectors. This is used to validate the accuracy of the time-offset measurement. Finally, this function generates phase-adjusted digital audio signal ynormadj, which can be temporarily substituted for the input digital audio), during blend ramps to improve sound quality.

[corr_coef,corr_phadj,ynormadj]=CORRELATION_
  METRICS(x,y,offset)

Figure 13:
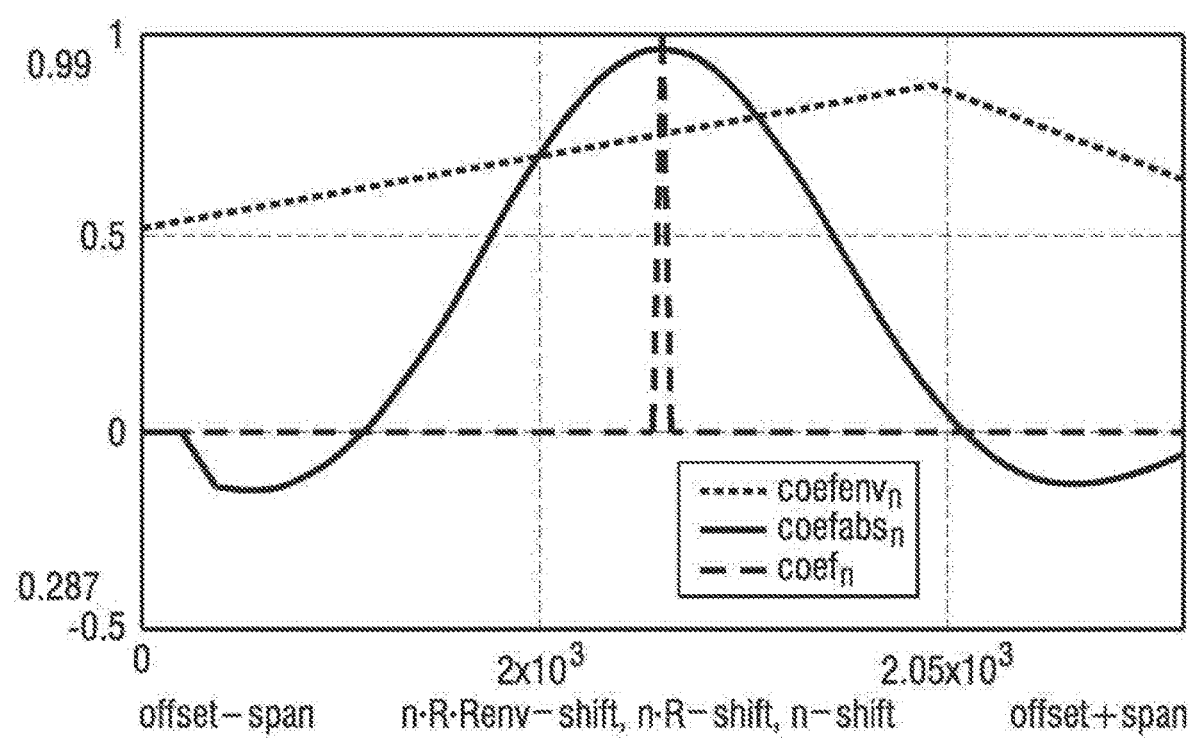
FIG. 13 is a graph of various cross-correlation coefficients.

Exemplary coarse (env), fine (abs), and input audio (x,y) cross-correlation coefficients are plotted together in FIG. 13.

The time-offset measurement technique described above was modeled and simulated with a variety of analog and digital input audio sources. The simulation was used to empirically set decision thresholds, refine logical conditions for validating correlation peaks, and gather statistical results to assess performance and compare with other automatic time-alignment approaches.

A test vector was input to the simulation and divided into multiple fixed-length blocks of analog and digital audio samples. Each pair of sample blocks was then correlated, and the peak value and index were used to measure the time offset. This process was repeated for all constituent sample blocks within the test vector. The results were then analyzed, and significant statistics were compiled for that particular vector.

Simulations were run on 10 different test vectors, with representative audio from various musical genres including talk, classical, rock, and hip-hop. All vectors applied different audio processing to the analog and digital streams, except for F-5+0+0CCC_Mono and F+0to-9+0+0DRR.

Correlations (as defined in the algorithm description above) were performed on all constituent blocks within a test vector. Time offset and measurement time were recorded for valid correlations. The results were then analyzed, and statistics were compiled for each vector. These statistics are tabulated in Table 1.

Since actual time offset is often unknown, mean offset is not a very useful statistic. Instead, the standard deviation of the time offset over all sample blocks comprising a test vector provides a better measure of algorithm precision. Mean measurement time is also a valuable statistic, indicating the amount of time it takes for the algorithm to converge to a valid result. These statistics are bolded in Table 1.

The results of Table 1 indicate that algorithm performance appears to be robust. The average time-offset standard deviation across all test vectors is 4.2 audio samples, indicating fairly consistent precision. The average measurement time across all test vectors is 0.5 seconds, which is well within HD Radio specifications. In fact, the worst-case measurement time across all vectors was just 7.2 seconds.

It is evident from Table 1 that the algorithm yields a relatively large range of estimated time offsets for some test vectors. This range is probably accurate, and is likely caused by different audio processing and the resulting group-delay differences between the analog and digital audio inputs. Unfortunately, there is no way to know the actual time offset at any given instant in each of the test vectors. As a result, ultimate verification of the algorithm can only be achieved through listening tests when implemented on a real-time HD Radio receiver platform.

TABLE 1

Simulation Statistical Results

| Test Vector | Time Offset (44.1-k Hz samples) | | | | Measurement Time (seconds) | | | |
| --- | --- | --- | --- | --- | --- | --- | --- | --- |
| | Min | Max | Mean | Std Dev | Min | Max | Mean | Std Dev |
| NJ_9470MHz | −1 | 4 | 2 | 1.3 | 0.2 | 2.4 | 0.4 | 0.3 |
| 109Vector | −197 | −149 | −178.3 | 10.6 | 0.2 | 4.3 | 0.7 | 0.7 |
| AM+0+0+0HRN | 7 | 20 | 12.5 | 2.7 | 0.2 | 7.2 | 1.1 | 1 |
| F-5+0+0CCC_Mono | −7 | −4 | −5 | 0.5 | 0.2 | 0.2 | 0.2 | 0 |

TABLE 1-continued

Simulation Statistical Results

| Test Vector | Time Offset (44.1-k Hz samples) | | | | Measurement Time (seconds) | | | |
| --- | --- | --- | --- | --- | --- | --- | --- | --- |
|  | Min | Max | Mean | Std Dev | Min | Max | Mean | Std Dev |
| F+0+0+0HuRuN_Mono | −7 | 14 | 6.9 | 4 | 0.2 | 2 | 0.4 | 0.3 |
| F+0+0+0TuTuN_Mono | −11 | 32 | 5.6 | 9.7 | 0.2 | 4.1 | 1 | 0.9 |
| F+0+0+0DuRuR_ M ono | −19 | −3 | −9.3 | 2.6 | 0.2 | 2.2 | 0.4 | 0.3 |
| F+0+0+0DuRuC_Mono | −8 | 12 | 4.2 | 2.6 | 0.2 | 2.2 | 0.3 | 0.3 |
| F+0+0+0DuRuN_Mono | −10 | 28 | 6.3 | 6 | 0.2 | 3 | 0.6 | 0.5 |
| F+0to-9+0+0DRR | −10 | 1 | −3.6 | 2.4 | 0.2 | 0.9 | 0.2 | 0.1 |

In addition to providing automatic time alignment in HD Radio receivers, the described algorithm has other potential applications. For instance, the described algorithm could be used in conjunction with an audio blending method, such as that described in commonly owned U.S. patent application Ser. No. 15/071,389, filed Mar. 16, 2016 and titled "Method And Apparatus For Blending An Audio Signal In An In Band On-Channel Radio System", to adjust blend thresholds and inhibit blending when misalignment is detected. This provides a dynamic blend threshold control.

Figure 14:
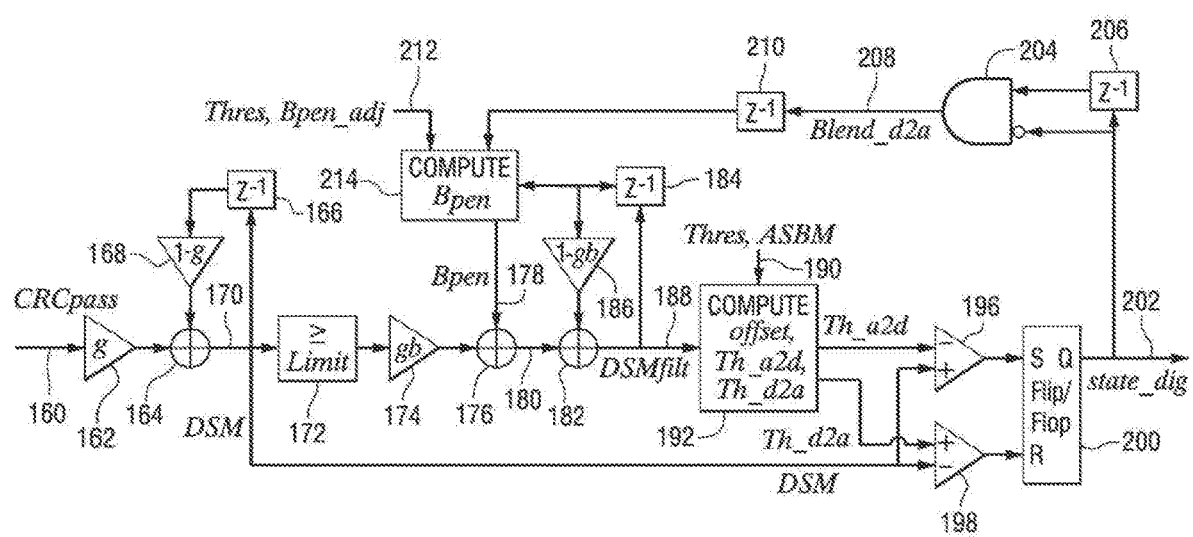
FIG. 14 is a signal-flow diagram of an audio blending algorithm with dynamic threshold control.

FIG. 14 is a signal-flow diagram of an audio blending algorithm with dynamic threshold control. A CRCpass signal on line 160 is amplified by amplifier 162 and passed to an adder 164. The output of the adder is delayed by delay block 166, amplified by amplifier 168 and returned to adder 164. This results in a digital signal measure (DSM) value on line 170. The DSM is limited in block 172, amplified by amplifier 174 and passed to adder 176, where it is added to a penalty signal Bpen on line 178. The resulting signal on line 180 passes to adder 182. The output of the adder 182 is delayed by delay block 184, amplified by amplifier 186 and returned to adder 182. This produces the DSMfid signal on line 188. The DSMfilt signal is used in combination with the Thres and ASBM signals on line 190 to compute an offset and thresholds Th_a2d and Th_d2a as shown in block 192. Th_a2d and Th_d2a are compared to DSM in comparators 196 and 198. The outputs of comparators 196 and 198 are used as inputs to flip flop 200 to produce a state_dig signal on line 202. The slate_dig signal is sent to an inverting input of AND gate 204 and delay block 206 produces a delayed state_dig signal for the other input of AND gate 204 to producethe Blend_d2a signal on line 208. The B!end_d2a signal is delayed by delay block 210 and used in combination with the Thres and Bpen_adj signals on line 212, and the delayed DSMfilt, to compute Bpen as shown in block 214.

The blend algorithm uses an Analog Signal Blend Metric (ASBM) to control its blend thresholds. The ASBM is currently fixed at 1 for MPS audio and 0 for SPS audio. However, the corr_coef or corr_phadj signal from the time-alignment algorithm could be used to scale ASBM on a continuum between 0 and 1. For instance, a low value of corr_coef or corr_phadj would indicate poor agreement between analog and digital audio, and would (with a few other parameters) scale ASBM and the associated blend thresholds to inhibit blending. Other alignment parameters that might be used to scale ASBM include level-alignment information, analog audio quality, audio bandwidth, and stereo separation.

In another embodiment, the time-offset measurement could also be used for automatic time alignment of the analog and digital audio signals in HD Radio hybrid transmitters. The offset (measured in samples at 44.1 ksps) can be filtered with a nonlinear IIR filter to improve the accuracy over a single measurement, while also suppressing occasional anomalous measurement results.

$$\text{offset\_filt}_k = \text{offsetfilt}_{k-1} + \alpha \cdot \max[-\text{lim}, \min(\text{lim}, \text{offset\_filt}_k - \text{offset\_filt}_{k-1})]$$

where ±lim is the maximum allowed input offset deviation from the present filtered offset_filt value. The recommended value for lim should be somewhat larger than the typical standard deviation of the offset measurements (e.g., lim=8 samples). The lim nonlinearity suppresses the effects of infrequent anomalous measured offset values. The parameter a of the single-pole IIR filter is related to its natural time constant τ seconds.

$$\tau = \frac{P}{\alpha}$$

where P is the offset measurement period in seconds. For example, if $\alpha = 1/16$ and P=3 seconds, then the IIR filter time constant is approximately 48 seconds. The time constant is defined as the response time to a step change in offset where the filtered output reaches $1-(1/e)$ (or about 63%) of the full step size, assuming the step size is less than ±lim. Step changes in time alignment offset are generally not expected; however, they could occur with changes in audio-processor settings.

The IIR filter reduces the standard deviation of the measured offset input values by the square root of α. The filtered offset value can be used to track and correct the time-alignment offset between the analog and digital audio streams.

In another embodiment, the described algorithm could be used for processing of intermittent or corrupted signals.

The time-offset measurement algorithm described above includes suggestions for measurements with an intermittent or corrupted signal. Exception processing may be useful under real channel conditions when digital audio packets are missing (e.g., due to corruption) or when the analog signal is affected by multipath fading, or experiences intentional soft muting and/or bandwidth reduction in the receiver. The receiver may inhibit time-offset measurements if or when these conditions are detected.

There are several implementation choices that can influence the efficiency of the algorithm. The normalization components of the correlation-coefficient computation do not need to be fully computed for every lag value across the correlation vector. The analog audio normalization component (e.g., Suua and Suub in the pseudocode of the first function corr_coef_vectors called by CROSS_CORRELATE) remains constant for every lag, so it is computed only once. The normalization energy, mean, and other components of the digital audio vector and its subsequent processed vectors can be simply updated for every successive lag by subtracting the oldest sample and adding the newest sample. Furthermore, the normalization components could be used later in a level-alignment measurement.

Also, the square-root operation can be avoided by using the square of the correlation coefficient, while preserving its polarity. Since the square is monotonically related to the original coefficient, the algorithm performance is not affected, assuming correlation threshold values are also squared.

After the initial time offset has been computed, the efficiency of the algorithm can be further improved by limiting the range of lag values, assuming alignment changes are small between successive measurements. The size M of the analog audio input vector x could also be reduced to limit processing requirements, although using too small an input vector could reduce the accuracy of the time-offset measurement.

Finally, the phase-adjusted digital audio ynormadj computed in the CORRELATION_METRICS function could actually be calculated in a different function. This signal was designed to improve sound quality by temporarily substituting it for input digital audio during blend ramps. But since blends occur sporadically, it could be more efficient to calculate ynormradj only as needed. In fact, the timing of the ynormadj calculation should be synchronized with the timing of the blend itself, to ensure that the phase-adjusted samples are ready to substitute. As a result, careful coordination with the blend algorithm is required for this feature.

From the above description it should be apparent that various embodiments of the described method for aligning analog and digital signals can be used in various types of signal processing apparatus, including radio receivers and radio transmitters. One embodiment of the method includes: receiving or generating an analog audio stream and a digital audio stream; and using a normalized cross-correlation of envelopes of the analog audio stream and the digital audio stream to measure a time offset between the analog audio stream and the digital audio stream. The normalized cross-correlation of envelopes can be computed using a vector of bandpass samples of the analog audio stream and a vector of bandpass samples of the digital audio stream.

Automatic Time Alignment Executive Control

Figure 15:
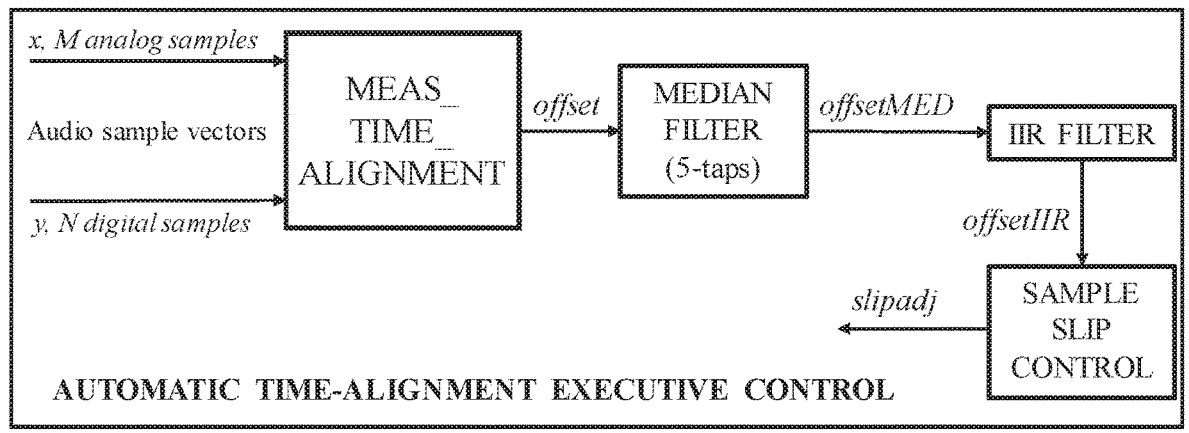
FIG. 15 is a functional diagram of a method to adjust time alignment of the analog and digital audio signals in HD Radio hybrid transmitters and receivers.

The time-offset measurement described above can be used for automatic time alignment of the analog and digital audio signals in HD Radio hybrid transmitters as well as receivers. FIG. 15 is functional block diagram of a method of Automatic Time-Alignment Executive Control for hybrid radio signals. The method can be performed using processing circuitry of a hybrid radio transmitter. The Automatic Time-Alignment Executive Control described herein is intended for use by the transmitter exciter; however, it can be adapted for use by a hybrid radio receiver.

Instead of continuously running repeated correlation attempts on contiguous blocks of input analog and digital audio samples, alignment offset measurements can be attempted at periodic intervals (e.g., several seconds), thereby reducing unnecessary computation. The method in FIG. 15 uses the offset values from the MEAS_TIME_ALIGNMENT algorithm, as previously described. The MEAS_TIME_ALIGNMENT function provides an output only when the measurement is determined to be valid, so the offset outputs are recurrent, but may not be strictly periodic. The analog and digital sample streams are aligned by shifting the digital audio sample stream by the slipadj output of the Automatic Time-Alignment Executive Control. The input vectors x and y are monophonic segments of the corresponding analog and digital audio streams, respectively. The ideal offset representing perfect alignment of the x and y input vectors should be established when these vectors are retrieved from the analog and digital audio sample stream buffers. The offset of the smaller analog audio vector x should be aligned with the corresponding y segment somewhere within they vector, preferably near the middle of they vector.

The sequence of measured offset values is not always constant due to changes in content-dependent audio group delay at different frequencies. This can be caused by audio processing (e.g., equalization) differences between the analog and digital audio streams. This "noise" on the offset values should be smoothed over time to prevent excessive slipadj corrections. There may also be offset drift if the analog and digital sample clocks are not synchronized.

The filtered offset value is used to track and correct the time-alignment offset between the analog and digital audio streams. The offset values from the MEAS_TIME_ALIGNMENT function are first input to a median filter (e.g., 5 elements) intended to eliminate offset values that are outliers or anomalous. The output (offsetMED) of the median filter is available only after its buffer is full (e.g., 5 offset inputs). The offsetMED values are further smoothed with a conventional 2-pole IIR filter to produce output offsetIIR. This IR filter can be implemented as $$\text{offsetIIR}_k = 2 \cdot (1-\alpha) \cdot \text{offsetIIR}_{k-1} - (1-\alpha)^2 \cdot \text{offsetIIR}_{k-2} + \alpha \cdot \text{offsetMED}_k$$

where $\alpha = \frac{1}{4}$, for example, for the kth sample.

The SAMPLE SLIP CONTROL function is used to adjust the relative offset between the analog and digital audio streams so they are properly aligned. The processing circuitry of the transmitter may provide an intentional diversity delay which is removed at the receiver such that the analog and digital audio streams are aligned at the receiver output. The ideal offset for the x and y vector alignment is assigned the value of aligned. So ideal alignment is achieved when offsetIIR=aligned. This is achieved by enforcing sample slips when offsetIIR does NOT equal aligned.

Hysteresis and limiting can be applied to reduce the magnitude and frequency of the alignment corrections, and thereby the probability of accompanying audible artifacts. The SAMPLE SLIP CONTROL function can be implemented with the following pseudocode.

$$\text{slip} = \textit{offsetIIR} - \text{aligned}$$

$$slipadj = \begin{cases} 1 & \text{if slip} > 0.75 \\ -1 & \text{if slip} < -0.75 \\ 0 & \text{Otherwise} \end{cases}$$

The slip adjustment slipadj can be applied in either a feedback or feedforward configuration, determined by the implementer of the alignment control.

Figure 16:
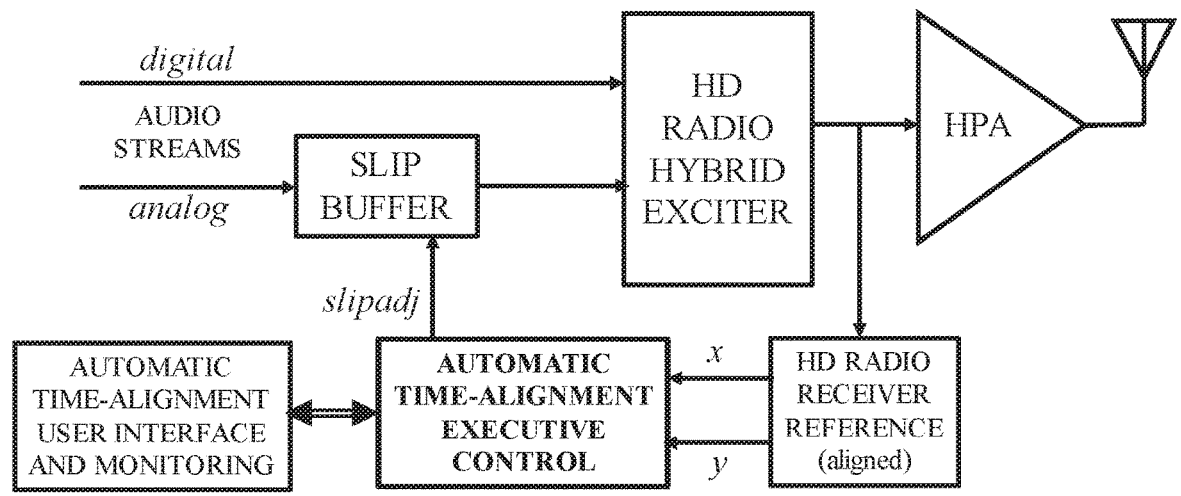
FIG. 16 is a block diagram of portions of a radio transmitter exciter engine subsystem with a feedback configuration for time alignment of analog and digital audio signals in hybrid radio signals.

FIG. 16 is a block diagram of portions of a radio transmitter exciter subsystem with one possible feedback configuration for time alignment of analog and digital audio signals in hybrid radio signals. The Automatic Time-Alignment Executive Control can be an algorithm performed by the processing circuitry of the radio transmitter exciter subsystem. The feedback configuration retrieves the x andy vectors from the corresponding analog and digital audio stream outputs of a properly time-aligned receiver. This receiver decodes the transmitted signal from the hybrid exciter. Then the Automatic Time-Alignment Executive Control retrieves the x and y audio vectors from the receiver output. The slip adjustment is applied to the audio before it is processed by the hybrid radio signal exciter and transmitted using the high-power amplifier (HPA). The radio transmitter exciter subsystem can include a slip buffer to offset one of the analog audio sample stream or the digital audio sample stream with respect to the other. In variations, the offset can be added by delaying one or more samples as it passes through the slip buffer, or by changing position of a pointer to samples in the slip buffer. The periodic time alignments should be sufficiently spaced to allow any slip adjustment to affect subsequent x and y vectors; otherwise, instability could occur. The Automatic Time-Alignment User Interface and Monitoring function allows the user to set parameters used in the alignment algorithms (such as aligned). It can also be used to monitor other useful statistical information as described later in this document.

Figure 17:
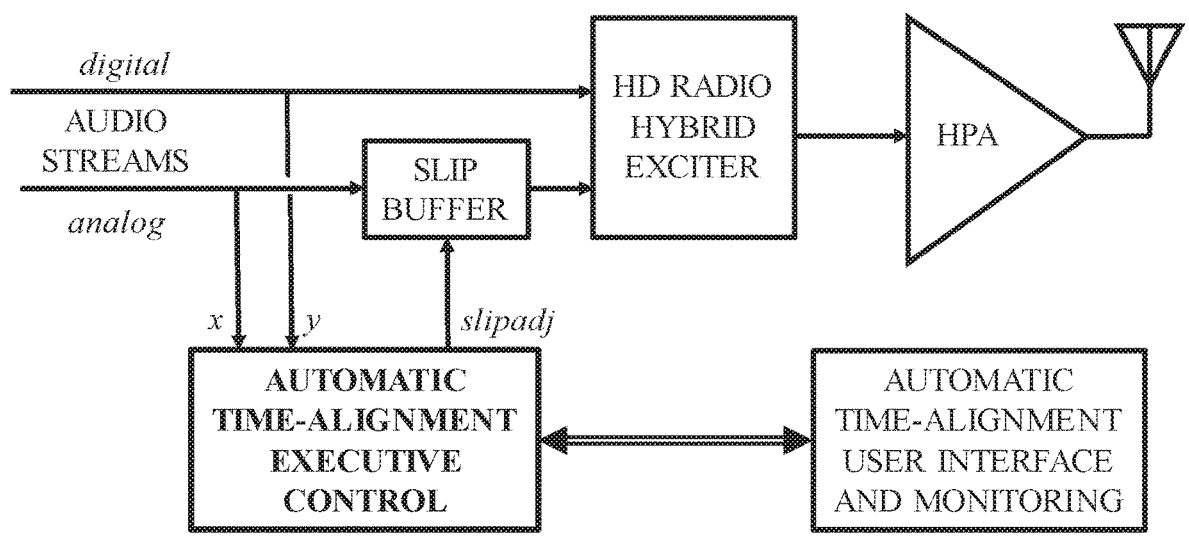
FIG. 17 is a block diagram of portions of a radio transmitter exciter engine subsystem with a feed forward configuration for time alignment of the analog and digital audio signals in hybrid radio signals.

FIG. 17 is a block diagram of portions of a radio transmitter exciter subsystem with one possible feedforward configuration. The feedforward option is to measure the x and y (mis)alignment prior to applying the analog and digital audio to the hybrid radio signal exciter. However, the desired alignment required by the hybrid radio signal exciter should be known in advance to accommodate any processing delays in the analog and digital audio streams.

Statistical Information for Monitoring Purposes

Several characteristics indicative of the alignment quality can be estimated and monitored by the processing circuitry of the radio transmitter exciter subsystem. These statistics can include sliprate, offsetSTDEV and corrIIR. The sliprate can be computed by filtering the values of slip with the 2-pole IIR filter.

$$sliprate_k = 2 \cdot (1-\alpha) \cdot sliprate_{k-1} - (1-\alpha)^2 \cdot sliprate_{k-2} + \alpha \cdot slip_k$$

The variance of the offset can be estimated by filtering the square of the difference between offset and offsetIIR.

$$offsetVAR_k = 2 \cdot (1-\alpha) \cdot offsetVAR_{k-1} - (1-\alpha)^2 \cdot offsetVAR_{k-2} + \alpha \cdot (offset_k - offsetIIR_k)^2$$

The standard deviation of the offset values may be preferred over the variance.

$$offsetSTDEV_k = \sqrt{offsetVAR_k}$$

One measure of the audio quality resulting from a receiver blend occurrence is the value of corr_coef. The analog and digital audio signals are more correlated as the value of corr_coef approaches 1. This can be measured by associating the values of corr_coef with the corresponding value of the measured offset in the median filter. This can be implemented by placing the corr_coef in another 5-element buffer simultaneous with the corresponding offset value in the median filter buffer. Then the corresponding corr_coef value is selected along with the median offset value with the same index, and subsequently processed by a matching IR filter.

$$corrIIR_k = 2 \cdot (1-\alpha) \cdot corrIIR_{k-1} - (1-\alpha)^2 \cdot corrIIR_{k-2} + \alpha \cdot corr\_coef_k$$

The described methods can be implemented in an apparatus such as a radio receiver or transmitter. The monitoring of the statistics can include calculations of the statistics by the processing circuitry and storing or recording the statistics in memory. The processing circuitry can present the statistics using display of a user interface. The processing circuitry can be programmed or otherwise configured to perform the functions described above. The processing circuitry can include baseband processing circuitry of a hybrid radio signal transmitter or hybrid radio signal receiver.

While the present invention has been described in terms of its preferred embodiments, it will be apparent to those skilled in the art that various modifications can be made to the described embodiments without departing from the scope of the invention as defined by the following claims.

What is claimed is:

1. A method for processing audio signals in a radio transmitter, the method comprising:
   receiving an analog audio sample stream and a digital audio sample stream;
   computing a normalized cross-correlation of audio envelopes using a vector of bandpass samples of the analog audio sample stream and a vector of bandpass samples of the digital audio sample stream;
   determining offsets in time between the analog audio sample stream and the digital audio sample stream using the normalized cross-correlation of audio envelopes;
   filtering the determined offsets in time to produce filtered offset values;
   determining an alignment slip adjustment value as a function of the filtered offset values;
   aligning the analog audio sample stream and the digital audio sample stream using the determined alignment slip adjustment value, wherein aligning the analog audio sample stream and the digital audio sample stream includes adjusting a relative offset between the analog and digital audio streams using limiting and hysteresis to reduce the magnitude and frequency of the adjusting; and
   generating a hybrid radio signal for broadcast that includes time-aligned analog audio and digital audio.

2. The method of claim 1, wherein filtering the determined offset includes filtering the determined offsets using one or both of a median filter and an infinite impulse response (IIR) filter.

3. The method of claim 1, further comprising:
   producing bifurcated and composite correlation peaks using the normalized cross-correlation of audio envelopes of the vector of bandpass samples of the analog audio sample stream and the vector of bandpass samples of the digital audio sample stream; and
   comparing the bifurcated and composite correlation peaks for correlation validation via temporal consistency.

4. The method of claim 1, further comprising:
   producing current and previous peaks using the normalized cross-correlation of audio envelopes of the vector of bandpass samples of the analog audio sample stream and the vector of bandpass samples of the digital audio sample stream;
   comparing the current and previous peaks for correlation validation via temporal consistency; and
   using quadratic interpolation of peak indices to improve resolution of a computed peak lag.

5. The method of claim 1, including
   determining a slip value as a difference between a filtered offset value and an ideal offset value, wherein the slip value is used to determine the alignment slip adjustment value; and
   monitoring a slip rate that represents a rate of change of determined slip values.

6. The method of claim 1, including monitoring one or both of a variance of the determined offsets in time and a standard deviation of the determined offsets in time.

7. The method of claim 1,
wherein determining the offsets in time using a normalized cross-correlation of audio envelopes includes computing cross-correlation coefficients of the audio envelopes of the analog audio sample stream and the digital audio sample stream; and
wherein the method further includes monitoring filtered values of the cross-correlation coefficients.

8. The method of claim 1, further comprising:
calculating phase-adjusted frequency-domain correlation coefficients; and
validating the offset in time using the phase-adjusted frequency-domain correlation coefficients.

9. A method for processing audio signals in a radio transmitter, the method comprising:
receiving an analog audio sample stream and a digital audio sample stream obtained from an analog audio stream and a digital audio stream;
determining offsets in time between the analog audio sample stream and the digital audio sample stream using a normalized cross-correlation of audio envelopes of the analog audio sample stream and the digital audio sample stream prior to transmitting the analog audio stream and digital audio stream using a transmitting amplifier of the radio transmitter, wherein determining offsets in time further comprises:
using a coarse envelope cross-correlation computed over a first range of lag values to locate a vicinity of the time offset; and
subsequently using a fine envelope cross-correlation computed over a second range of lag values, where in the second range of lag values is narrower than the first range of lag values;
filtering the determined offsets in time to produce filtered offset values;
determining an alignment slip adjustment value as a function of the filtered offset values;
aligning the analog audio sample stream and the digital audio sample stream using the determined alignment slip adjustment; and
generating a hybrid radio signal for broadcast that includes time-aligned analog audio and digital audio.

10. The method of claim 9, wherein filtering the determined offset includes filtering the determined offsets using one or both of a median filter and an infinite impulse response (IIR) filter.

11. The method of claim 9, wherein aligning the analog audio sample stream and the digital audio sample stream includes adjusting a relative offset between the analog and digital audio streams using limiting and hysteresis to reduce the magnitude and frequency of the adjusting.

12. The method of claim 9,
wherein determining offsets in time includes measuring the offsets in time after processing by a hybrid radio signal exciter;
wherein aligning the analog audio sample stream and the digital audio sample stream includes applying the slip adjustment to the audio before the audio is processed by a hybrid radio signal exciter for broadcast;
decoding a transmitted hybrid radio signal from a hybrid radio signal exciter using a properly time-aligned radio receiver;
retrieving samples of analog audio and samples of digital audio from the corresponding analog audio stream output and digital audio stream output of the properly time-aligned radio receiver; and
measuring the offsets in time using the retrieved samples of analog audio and retrieved samples of digital audio.

13. The method of claim 9,
wherein determining offsets in time includes measuring the offsets in time before processing by a hybrid radio signal exciter; and
wherein aligning the analog audio sample stream and the digital audio sample stream includes applying the slip adjustment to the audio before the audio is processed by a hybrid radio signal exciter for broadcast.

14. An apparatus for generating a hybrid radio signal for broadcast, the apparatus comprising:
a digital input port configured to receive a digital audio sample stream;
an analog input port configured to receive an analog audio sample stream;
processing circuitry configured to:
compute a normalized cross-correlation of audio envelopes using a vector of bandpass samples of the analog audio sample stream and a vector of bandpass samples of the digital audio sample stream;
determine offsets in time between the analog audio sample stream and the digital audio sample stream using the normalized cross-correlation of audio envelopes;
filtering the determined offsets in time to produce filtered offset values;
determine an alignment slip adjustment value as a function of the filtered offset values;
align the analog audio sample stream and the digital audio sample stream using the determined alignment slip adjustment value;
adjust a relative offset between the analog audio sample stream and the digital audio sample stream using limiting and hysteresis; and
generate a hybrid radio signal for broadcast that includes time-aligned analog audio and digital audio.

15. The apparatus of claim 14, wherein the processing circuitry is configured to filter the determined offsets using one or both of a median filter and an infinite impulse response (HR) filter.

16. The apparatus of claim 14, including a slip buffer configured to offset one of the analog audio sample stream or the digital audio sample stream with respect to the other of the analog audio sample stream or the digital audio sample stream using the determined alignment slip adjustment value, and change the offset using the hysteresis according to a slip value determined as a difference between a filtered offset value and an ideal offset value.

17. The apparatus of claim 14, including:
a hybrid radio signal exciter; and
wherein the processing circuitry is configured to:
measure the offsets in time after the analog audio sample stream and the digital audio sample stream are processed by the hybrid radio signal exciter; and
apply the slip adjustment to the audio before the audio is processed by a hybrid radio signal exciter for broadcast.

18. The apparatus of claim 17, including:
a radio receiver configured to decode a hybrid radio signal transmitted by the hybrid radio signal exciter;
wherein the processing circuitry is configured to:
retrieve samples of analog audio and samples of digital audio from the corresponding analog audio stream output and digital audio stream output of the radio receiver; and measure the offsets in time using the retrieved samples of analog audio and retrieved samples of digital audio.

19. The apparatus of claim 14, including:

a hybrid radio signal exciter; and wherein the processing circuitry is configured to:
  receive the analog audio sample stream and the digital audio sample stream before processing by the hybrid radio signal exciter;
  measure the offsets in time before the processing by the hybrid radio signal exciter; and
  apply the slip adjustment to the audio before it is processed by the hybrid radio signal exciter for broadcast.

* * * * *